(12) United States Patent
Suzuki et al.

(10) Patent No.: US 12,285,696 B2
(45) Date of Patent: Apr. 29, 2025

(54) INFORMATION PROCESSING SYSTEM, INFORMATION PROCESSING APPARATUS, STORAGE MEDIUM AND INFORMATION PROCESSING METHOD

(71) Applicant: NINTENDO CO., LTD., Kyoto (JP)

(72) Inventors: Toshiaki Suzuki, Kyoto (JP); Misaki Hiraga, Kyoto (JP); Rina Wegner, Tokyo (JP); Karin Kawakami, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 296 days.

(21) Appl. No.: 17/945,488

(22) Filed: Sep. 15, 2022

(65) Prior Publication Data

US 2023/0089066 A1    Mar. 23, 2023

(30) Foreign Application Priority Data

Sep. 21, 2021    (JP) .................................. 2021-152860

(51) Int. Cl.
*A63F 13/798*    (2014.01)
*A63F 13/537*    (2014.01)

(52) U.S. Cl.
CPC .......... *A63F 13/798* (2014.09); *A63F 13/537* (2014.09)

(58) Field of Classification Search
CPC .............................. A63F 13/798; A63F 13/537
See application file for complete search history.

(56) References Cited

U.S. PATENT DOCUMENTS 10,183,220 B2    1/2019    Tamaoki et al.
2003/0228908 A1*    12/2003    Caiafa .................... A63F 13/30
463/42

(Continued)

FOREIGN PATENT DOCUMENTS

JP    2016-189999    11/2016
JP    2019-022664    2/2019

(Continued)

OTHER PUBLICATIONS

Matthias R, MK64—award ceremony, Nov. 2, 2008, Youtube.com, p. 1, at https://www.youtube.com/watch?v=H9wupG5fEaU (last visited Feb. 24, 2025). (Year: 2008).*

(Continued)

*Primary Examiner* — Steve Rowland
(74) *Attorney, Agent, or Firm* — Nixon & Vanderhye PC

(57) ABSTRACT

A non-limiting example game system includes a main body apparatus, and the main body apparatus performs communication with another main body apparatus in a communication game to play a virtual game. The virtual game is a multiplayer game that a plurality of players compete against each other, and a place of an overall ranking is determined for each player. If a main story of the virtual game is ended, a ranking announcement screen including a ranking message and a praise screen including a praise message are displayed in this order for each place of the overall ranking. The praise message is selected from a praise message table of the first place of the overall ranking and a praise message table except the first place of the overall ranking. The praise message table is set with a praise message corresponding to a praise content, and when determining a praise message for each place of the overall ranking, a praise message already having been determined as a praise message for another player is not redundantly determined.

20 Claims, 28 Drawing Sheets

(56) References Cited

U.S. PATENT DOCUMENTS

| | | | |
|---|---|---|---|
| 2007/0087797 A1* | 4/2007 | Van Luchene | A63F 13/85 463/1 |
| 2007/0087799 A1* | 4/2007 | Van Luchene | A63F 13/847 463/1 |
| 2007/0265043 A1* | 11/2007 | Wang | A63F 13/12 463/2 |
| 2008/0113742 A1* | 5/2008 | Amos | G07F 17/32 463/16 |
| 2009/0069091 A1* | 3/2009 | Yamamoto | A63F 13/798 463/42 |
| 2013/0210511 A1* | 8/2013 | LaRocca | G07F 17/3276 463/20 |
| 2013/0246972 A1* | 9/2013 | Tateno | G06F 16/955 715/825 |
| 2014/0179425 A1* | 6/2014 | Perry | A63F 13/63 463/31 |
| 2016/0260043 A1* | 9/2016 | Nahmad | G06Q 10/06398 |
| 2017/0358170 A1* | 12/2017 | Ito | G07F 17/329 |
| 2018/0025586 A1* | 1/2018 | Lockton | G07F 17/3288 463/42 |
| 2019/0262720 A1* | 8/2019 | Trombetta | A63F 13/211 |
| 2020/0043293 A1* | 2/2020 | Nelson | G07F 17/3276 |
| 2021/0343104 A1* | 11/2021 | Stankevich | G07F 17/3209 |
| 2023/0186727 A1* | 6/2023 | Olive | G07F 17/3258 463/20 |
| 2023/0284799 A1* | 9/2023 | Sloan | A47G 1/12 |
| 2024/0214464 A1* | 6/2024 | Goteti | H04L 67/54 |
| 2024/0286042 A1* | 8/2024 | Lieu | A63F 13/822 |
| 2024/0290167 A1* | 8/2024 | Nelson | G07F 17/3225 |
| 2024/0290177 A1* | 8/2024 | Farahi | G07F 17/323 |

FOREIGN PATENT DOCUMENTS

| | | |
|---|---|---|
| JP | 2019-166220 | 10/2019 |
| JP | 2021-023742 | 2/2021 |

OTHER PUBLICATIONS

This is it. A perfect racing game in a good way. I played "Mini Motor Racing 2" and got into it!, Dengeki Online, Nov. 28, 2020, https://dengekionline.com/article/58225/ [searched on Feb. 24, 2023] (with partial English translation), 32 pages.

Jul. 11, 2023 Decision to Grant issued in Japanese Patent Application No. 2021-152860, pp. 1-2.

Maybe you haven't gotten the most out of PS5? Introducing the various features of PS5 to know for not only developers but also users! [CEDEC2021], Gamer [online], Aug. 25, 2021, https://www.gamer.ne jp/news/202108250068/ [searched on Feb. 21, 2023], machine translation included.

"Mario Party Superstars—Nintendo Treehouse: Live I E3 2021", Jun. 15, 2021, 1 page, https://www.youtube.com/watch?v=ECpO8LaxeIo.

Mar. 7, 2023 Office Action issued in Japanese Patent Application No. 2021-152860, with translation, pp. 1-5.

Story about developing random matching application that you can enjoy remote card game freely, May 15, 2020, https://qiita.com/blachocolat/ items/b1f9e3e9b25604fde47f, [searched on Feb. 27, 2023] (15 pages).

* cited by examiner

EVALUATION SCREEN (AT START)

EVALUATION SCREEN (RUNTIME)

FIG. 17

RANKING MESSAGE TABLE

| RANKING | MESSAGE |
|---|---|
| FIRST PLACE | CONGRATULATIONS, YOUR ARE IN FIRST PLACE<br>MR./MS. XX, GREAT |
| FIRST PLACE | MR./MS. XX, CONGRATULATIONS ON YOUR FIRST PLACE<br>THAT'S GREAT |
| SECOND PLACE | MR./MS. XX, YOU CAME IN A CLOSE SECOND<br>LET'S TAKE FIRST PLACE NEXT TIME FOR SURE |
| SECOND PLACE | THAT WAS CLOSE<br>MR./MS. XX, YOU ARE IN SECOND PLACE |
| THIRD PLACE | MR./MS. XX, GOOD JOB<br>YOU ARE IN THIRD PLACE THIS TIME |
| THIRD PLACE | MR./MS. XX, SORRY, YOU ARE IN THIRD PLACE THIS TIME<br>LET'S AIM FOR UPPER PLACE NEXT TIME |
| FOURTH PLACE | MR./MS. XX, YOU ARE IN FOURTH PLACE THIS TIME<br>YOU DID YOUR BEST TILL THE END |
| FOURTH PLACE | MR./MS. XX, YOU DID YOUR BEST BUT ARE IN FOURTH PLACE<br>RIVALS WERE STRONG |

FIG. 18

PRAISE MESSAGE TABLE FOR FIRST PLACE OF OVERALL RANKING

| PRIORITY | PRAISE CONTENTS | PRAISE MESSAGE |
|---|---|---|
| 24 | NUMBER OF ACQUIRED COINS | YOU ACQUIRED A LOT OF COINS, AND MADE GREAT WIN |
| 25 | WINNING PERCENTAGE OF MINI GAME | DECISIVE FACTOR TO VICTORY IS HIGHEST WINNING PERCENTAGE OF MINI GAMES |
| 16 | NUMBER OF ITEM USE TIMES | YOU USED ITEM WELL AND GRABBED VICTORY |
| 15 | MOVEMENT AMOUNT | YOU MOVED ENERGETICALLY AND WON CHAMPIONSHIP STEADILY |
| 5 | NUMBER OF TIMES STOPPING AT POSITIVE SQUARE | YOU STOPPED AT POSITIVE SQUARE A LOT DECISIVE FACTOR TO VICTORY IS YOU COULD ACQUIRE COINS STABLY |
| 4 | NUMBER OF TIMES STOPPING AT NEGATIVE SQUARE | IT'S SURPRISING YOU WON EVEN THOUGH STOPPED AT NEGATIVE SQUARE THE MOST |
| 8 (17) | NUMBER OF TIMES STOPPING AT ITEM SQUARE | YOU OBTAINED ITEMS A LOT AND USED THEM WELL |
| 10 (18) | NUMBER OF TIMES STOPPING AT UNEXPECTED-EVENT SQUARE | A LOT OF UNEXPECTED-EVENTS OCCURRED, BUT YOU WON THAT WAS LUCKY |
| ⋮ | ⋮ | ⋮ |
| 1 | NOTHING | DECISIVE FACTOR TO VICTORY IS BALANCED MATCH |
| 1 | NOTHING | IT'S STABLE PLAY NO WONDER YOU WON |

FIG. 19

PRAISE MESSAGE EXCEPT FIRST PLACE OF OVERALL RANKING

| PRIORITY | PRAISE CONTENTS | PRAISE MESSAGE |
|---|---|---|
| 24 | NUMBER OF ACQUIRED COINS | IT SEEMS YOU ACQUIRED MORE COINS THAN ANYONE ELSE<br>VERY IMPRESSIVE |
| 25 | WINNING PERCENTAGE OF MINIGAME | IT SEEMS YOUR WINNING PERCENTAGE OF MINIGAME WAS HIGHEST<br>VERY IMPRESSIVE |
| 16 | NUMBER OF ITEM USE TIMES | YOU USED ITEM A LOT<br>GREAT |
| 15 | MOVEMENT AMOUNT | YOU MOVED A LOT AND DID YOUR BEST |
| 5 | NUMBER OF TIMES STOPPING AT POSITIVE SQUARE | YOU STOPPED AT POSITIVE SQUARE MORE TIMES THAN ANYONE ELSE<br>IT SEEMS YOU ACQUIRED COINS STABLY |
| 4 | NUMBER OF TIMES STOPPING AT NEGATIVE SQUARE | IT SEEMS YOU STOPPED AT NEGATIVE SQUARE MORE TIMES THAN ANYONE ELSE<br>YOU DID YOUR BEST WITHOUT ANY SETBACKS |
| 8 (17) | NUMBER OF TIMES STOPPING AT ITEM SQUARE | IT SEEMS YOU OBTAINED MORE ITEMS THAN ANYONE ELSE |
| 10 (18) | NUMBER OF TIMES STOPPING AT UNEXPECTED-EVENT SQUARE | YOU ENJOYED WHILE OCCURRING A LOT OF UNEXPECTED-EVENTS |
| ⋮ | ⋮ | ⋮ |
| 1 | NOTHING | IT'S GOOD MATCH<br>VERY NICE |
| 1 | NOTHING | IT'S STABLE PLAY<br>VERY NICE |

INFORMATION PROCESSING SYSTEM, INFORMATION PROCESSING APPARATUS, STORAGE MEDIUM AND INFORMATION PROCESSING METHOD

CROSS REFERENCE OF RELATED APPLICATION

This application claims a priority to Japanese Patent Application No. 2021-152860 filed on Sep. 21, 2021, and the entire contents of which are incorporated herein by reference.

FIELD

This application describes an information processing system, an information processing apparatus, a storage medium and an information processing method, performing a competitive game that a plurality of players play.

SUMMARY

It is a primary object of an embodiment(s) to provide a novel information processing system, information processing apparatus, storage medium and information processing method.

Moreover, it is another object of the embodiment(s) to provide an information processing system, information processing apparatus, storage medium and information processing method, capable of diversifying contents of a result display.

A first embodiment is an information processing system, comprising: a game performer that performs a competitive game that a plurality of players compete against each other; a ranking determiner that determines ranking of the payers in the competitive game based on an evaluation value that is updated for each payer in accordance with progress of the competitive game; an index updater that updates, for each player, an index associated with a game event, out of a plurality of indices that are related to the competitive game and different from the evaluation value, according to the game event occurring in the competitive game; a notable index determiner that determines, for each player, at least one notable index from the plurality of indices by comparing an index with those of other players; a message determiner that determines, for each player, an index message that is a message associated with the target index; and a message outputter that outputs an image that a plurality of index messages determined for the plurality of players are arranged so that the plurality of index messages are displayed on a display.

According to the first embodiment, the content of result display can be diversified.

A second embodiment is the information processing system according to the first embodiment, further comprising a group classifier that classifies the plurality of players into two or more groups based on the ranking of the players, wherein different indices messages are associated to the same target index for each group.

According to the second embodiment, since the index message of the content corresponding to the ranking can be displayed, it is possible to diversify the index message to be displayed.

The third embodiment is the information processing system according to the second embodiment, wherein the group classifier classifies the plurality of players into a first group including a player whose ranking is a first place and a second group including a player whose ranking is not the first place.

According to the third embodiment, since the plurality of players are classified into a group of the first place and a group of a place not the first place, it is possible to present a praise message to the first place and reduce an amount of creation of praise messages for players not the first place. Moreover, since the players of the second place or lower place are common in a fact that they are not the first place, even if the praise message is commonly used for such players, it does not almost have feeling uncomfortable.

A fourth embodiment is the information processing system according to the first embodiment, wherein the notable index determiner determines an index that is of the first place out of the plurality of players as the target index.

According to the fourth embodiment, since the index higher than those of the other players is determined as the notable index, it is possible to display the index message associated with the index superior to the other players.

A fifth embodiment is the information processing system according to the first embodiment, wherein the notable index determiner determines, when the plurality of indices become candidates for notable indices, one notable index based on priorities associated with respective indices.

According to the fifth embodiment, it is possible to determine one index based on the priority.

A sixth embodiment is the information processing system according to the fifth embodiment, wherein the notable index determiner determines one notable index based on the priority that is set so as to make the index that is a first place alone easier to be determined as the notable index.

According to the sixth embodiment, by making the priority of the index that is the first place alone higher, for example, the index that is the first place alone can be determined as the notable index.

A seventh embodiment is the information processing system according to the fifth embodiment, wherein the priority is changeable dependent on value of the index.

According to the seventh embodiment, since the priority is changed according to the value of the index, it is possible to make the index that is changed so that the priority becomes higher easy to determine as the notable index.

An eighth embodiment is the information processing system according to the first embodiment, wherein the notable index determiner determines the notable index so that notable index does not duplicate between the players.

According to the eighth embodiment, since the notable index is determined so as not to be duplicate, it is possible to make the index message does not duplicate between the players. That is, it is possible to diversify the index message.

A ninth embodiment is the information processing system according to the first embodiment, further comprising a plurality of game apparatuses each used by each of the plurality of players, wherein the game performer performs the competitive game by connecting the plurality of game apparatuses with each other directly or via a local area network, and the message outputter outputs an image in which the index messages are arranged so that the index message determined for own player is displayed on an own display and the index message determined for a further player is also displayed on the own display.

According to the ninth embodiment, since other players are generally acquaintances, it is possible to activate communication by displaying the index messages for all the players.

A tenth embodiment is the information processing system according to the first embodiment, further comprising a plurality of game apparatuses each used by each of the plurality of players, wherein the game performer performs the competitive game by connecting the plurality of game apparatuses with each other via a wide area network, and the message outputter outputs, when the competitive game is an online game that is randomly matched with a further player not registered in advance, an image in which the index messages are arranged so that the index message determined for own player is displayed on an own display and the index message determined for the further player is not displayed on the own display.

According to the tenth embodiment, when playing the online game with an unknown further player who is not registered in advance, the index message determined for own player is displayed but the index message determined for the unknown further player is not displayed, it is possible to shorten a time period of the result display by not displaying the index message with the low necessity of getting to know.

An eleventh embodiment is the information processing system according to the first embodiment, wherein the message determiner determines one message from a plurality of ranking messages associated with for the place of ranking, and the message outputter outputs an image that the one ranking message is arranged so that the one ranking message is displayed on a display in addition to the index message.

According to the eleventh embodiment, since not only the index message but the ranking message is displayed, it is possible to diversify of the result display with their combination.

A twelfth embodiment is the information processing system according to the first embodiment, wherein the message determiner determines a general-purpose message for the player that no notable index exists instead of the index message, and the message outputter outputs an image that the generic message is arranged so that the generic message is displayed instead of the index message.

According to the twelfth embodiment, since a general-purpose message is displayed for the player that no notable index exists, it is possible to diversify of the result display.

A thirteenth embodiment is the information processing system according to the first embodiment, wherein the ranking is a final ranking of the competitive game.

A fourteenth embodiment is the information processing system according to the thirteenth embodiment, wherein the message outputter outputs the image that the index message is arranged after outputting an image indicating the final ranking of the competitive game.

According to the fourteenth embodiment, it is possible to the index message supplementarily after announcing the ranking.

A fifteenth embodiment is an information processing apparatus, comprising: a game performer that performs a competitive game that a plurality of players compete against each other; a ranking determiner that determines ranking of the payers in the competitive game based on an evaluation value that is updated for each payer in accordance with progress of the competitive game; an index updater that updates, for each player, an index associated with a game event, out of a plurality of indices that are related to the competitive game and different from the evaluation value, according to the game event occurring in the competitive game; a notable index determiner that determines, for each player, at least one notable index from the plurality of indices by comparing an index with those of other players; a message determiner that determines, for each player, an index message that is a message associated with the target index; and a message outputter that outputs an image that a plurality of index messages determined for the plurality of players are arranged so that the plurality of index messages are displayed on a display.

A sixteenth embodiment is a non-transitory computer-readable storage medium storing an information processing program executable by a computer of an information processing apparatus, wherein the information processing program causes the computer to: perform a competitive game that a plurality of players compete against each other; determine ranking of the payers in the competitive game based on an evaluation value that is updated for each payer in accordance with progress of the competitive game; update, for each player, an index associated with a game event, out of a plurality of indices that are related to the competitive game and different from the evaluation value, according to the game event occurring in the competitive game; determine, for each player, at least one notable index from the plurality of indices by comparing an index with those of other players; determine, for each player, an index message that is a message associated with the target index; and output an image that a plurality of index messages determined for the plurality of players are arranged so that the plurality of index messages are displayed on a display.

A seventeenth embodiment is an information processing method of an information processing apparatus, comprising: performing a competitive game that a plurality of players compete against each other; determining ranking of the payers in the competitive game based on an evaluation value that is updated for each payer in accordance with progress of the competitive game; updating, for each player, an index associated with a game event, out of a plurality of indices that are related to the competitive game and different from the evaluation value, according to the game event occurring in the competitive game; determining, for each player, at least one notable index from the plurality of indices by comparing an index with those of other players; determining, for each player, an index message that is a message associated with the target index; and outputting an image that a plurality of index messages determined for the plurality of players are arranged so that the plurality of index messages are displayed on a display.

According to the fifteenth to seventeenth embodiments, it is possible to diversify the content of the result display like the first embodiment.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 17 is a view showing a non-limiting example ranking message table.

FIG. 18 is a view showing a non-limiting example praise message table to the first place.

FIG. 19 is a view showing a non-limiting example praise message table except the first place.

DETAILED DESCRIPTION OF NON-LIMITING EXAMPLE EMBODIMENTS

A non-limiting example game system according to an exemplary embodiment will be described in the following. The non-limiting example game system 1 according to this embodiment comprises a main body apparatus (an information processing apparatus that functions as a game apparatus main body in this embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2). In the following, the hardware structure of the game system 1 according to this embodiment will be described, and then, the control of the game system 1 of this embodiment will be described.

Figure 1:
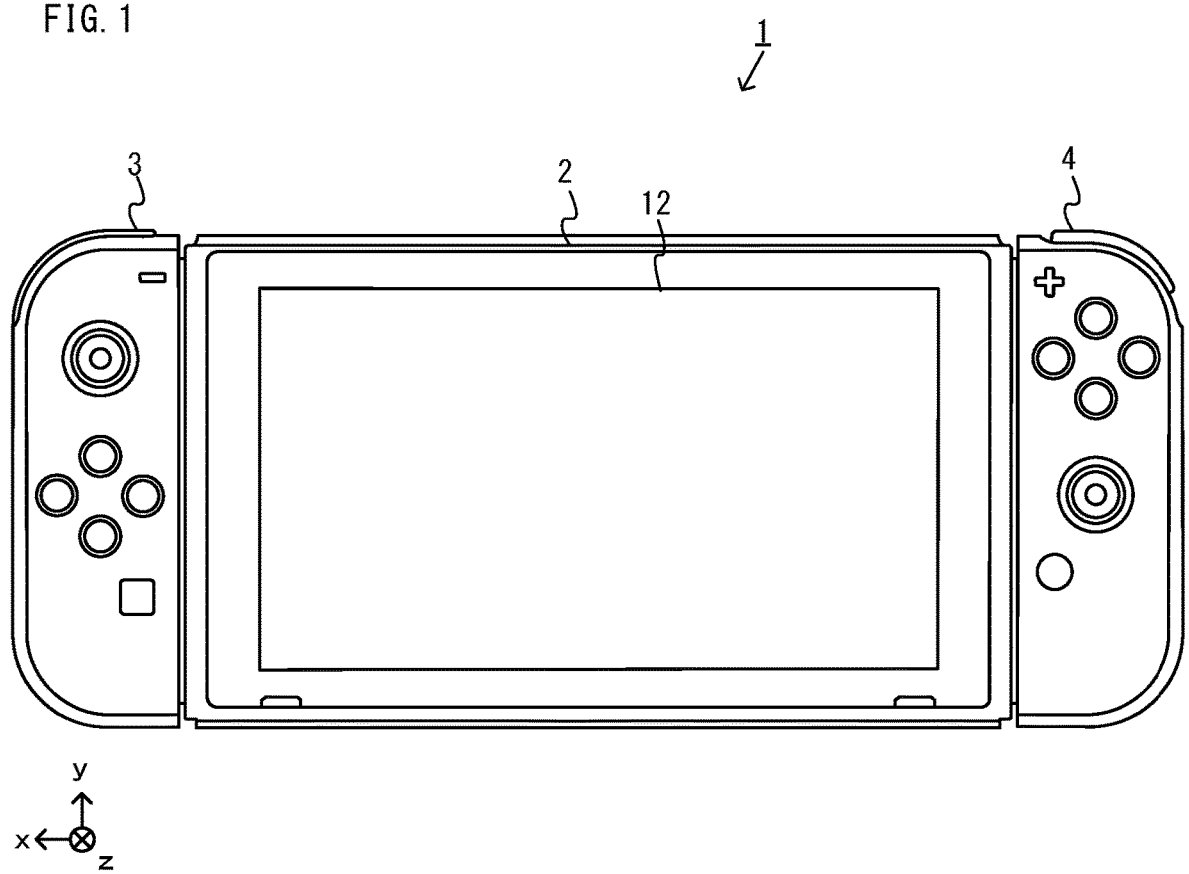
FIG. 1 is an illustration view showing a non-limiting example state wherein a left controller and a right controller are attached to a main body apparatus of this embodiment.

FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
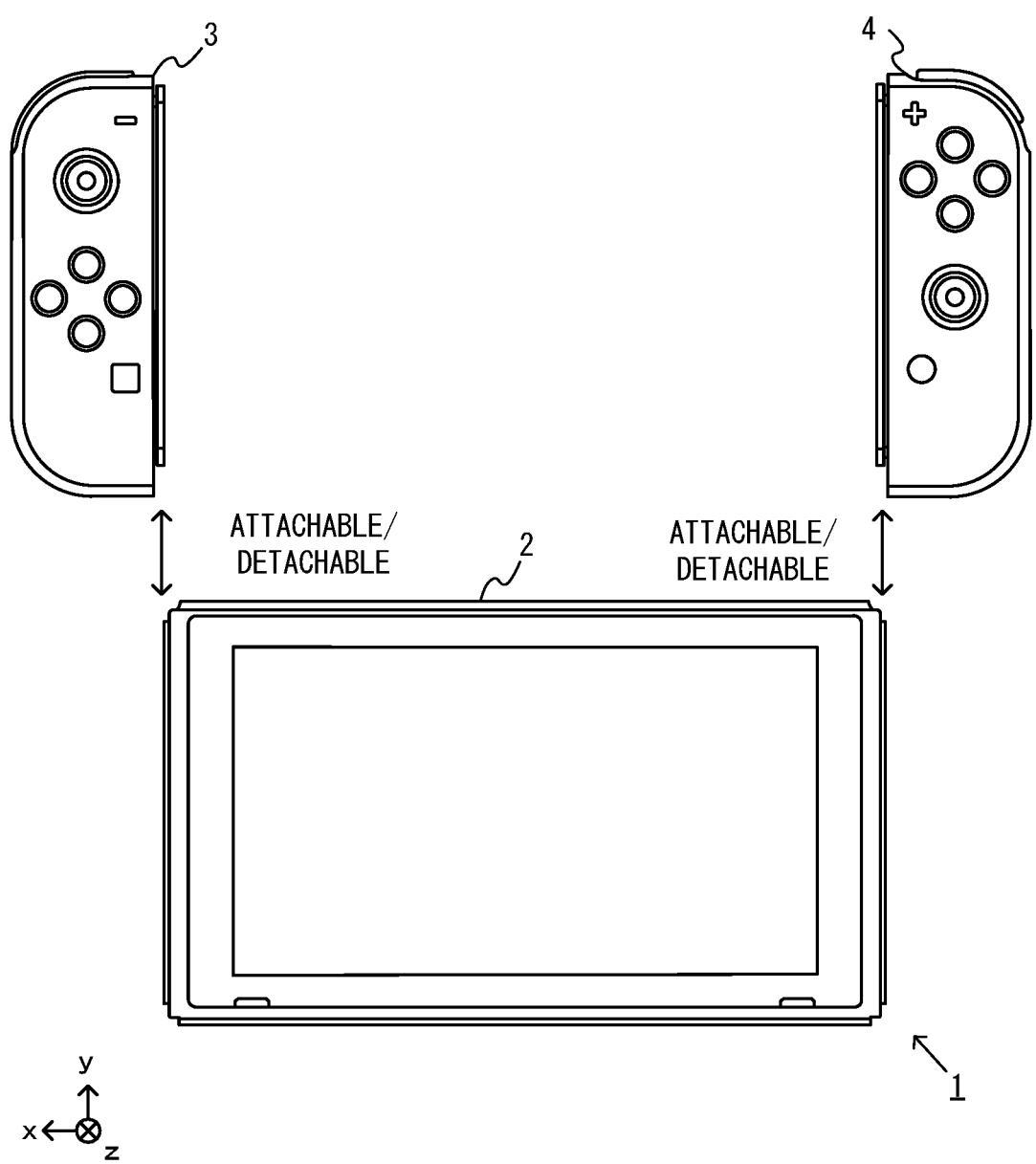
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIG. 1 and FIG. 2, each of the left controller 3 and the right controller 4 is attachable to and detachable from the main body apparatus 2. In addition, it should be noted that the left controller 3 and the right controller 4 may be referred to collectively as a "controller" in the following.

Figure 3:
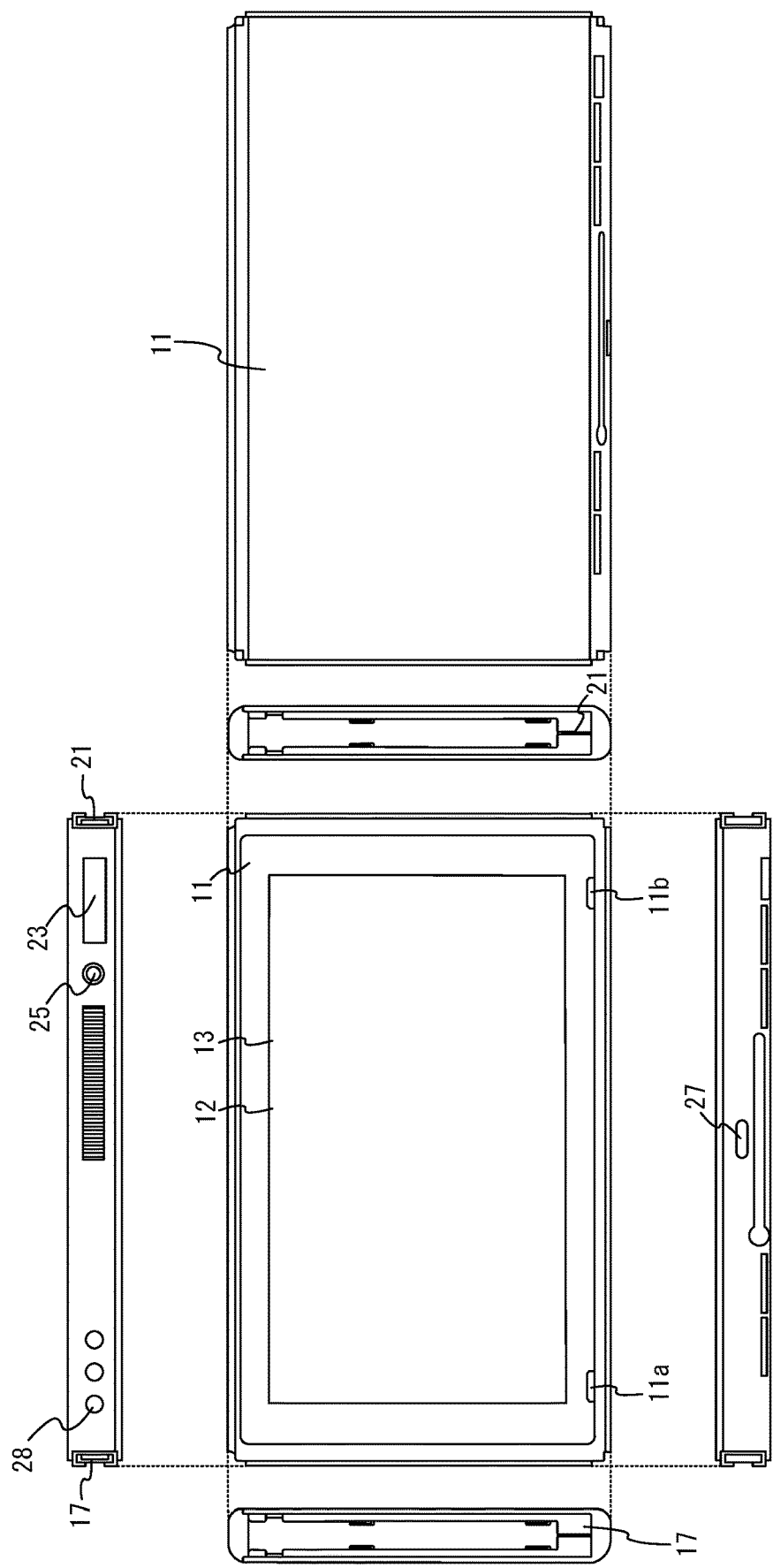
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In this embodiment, a main surface (in other words, a surface on a front side, that is, a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may be a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In this embodiment, the display 12 is a liquid crystal display device (LCD). However, the display 12 may be an arbitrary type display.

Moreover, the main body apparatus 2 comprises a touch panel 13 on a screen of the display 12. In this embodiment, the touch panel 13 is of a type that allows a multi-touch input (e.g., a capacitive type). However, the touch panel 13 may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are emitted through the speaker holes 11a and 11b.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e.g., a dedicated memory card) for the game system 1 or an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In this embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in this embodiment, the cradle has the function of charging the unified apparatus or the main body apparatus 2 alone that is put on the cradle. Moreover, the cradle has a function of a hub device (specifically, a USB hub).

Figure 4:
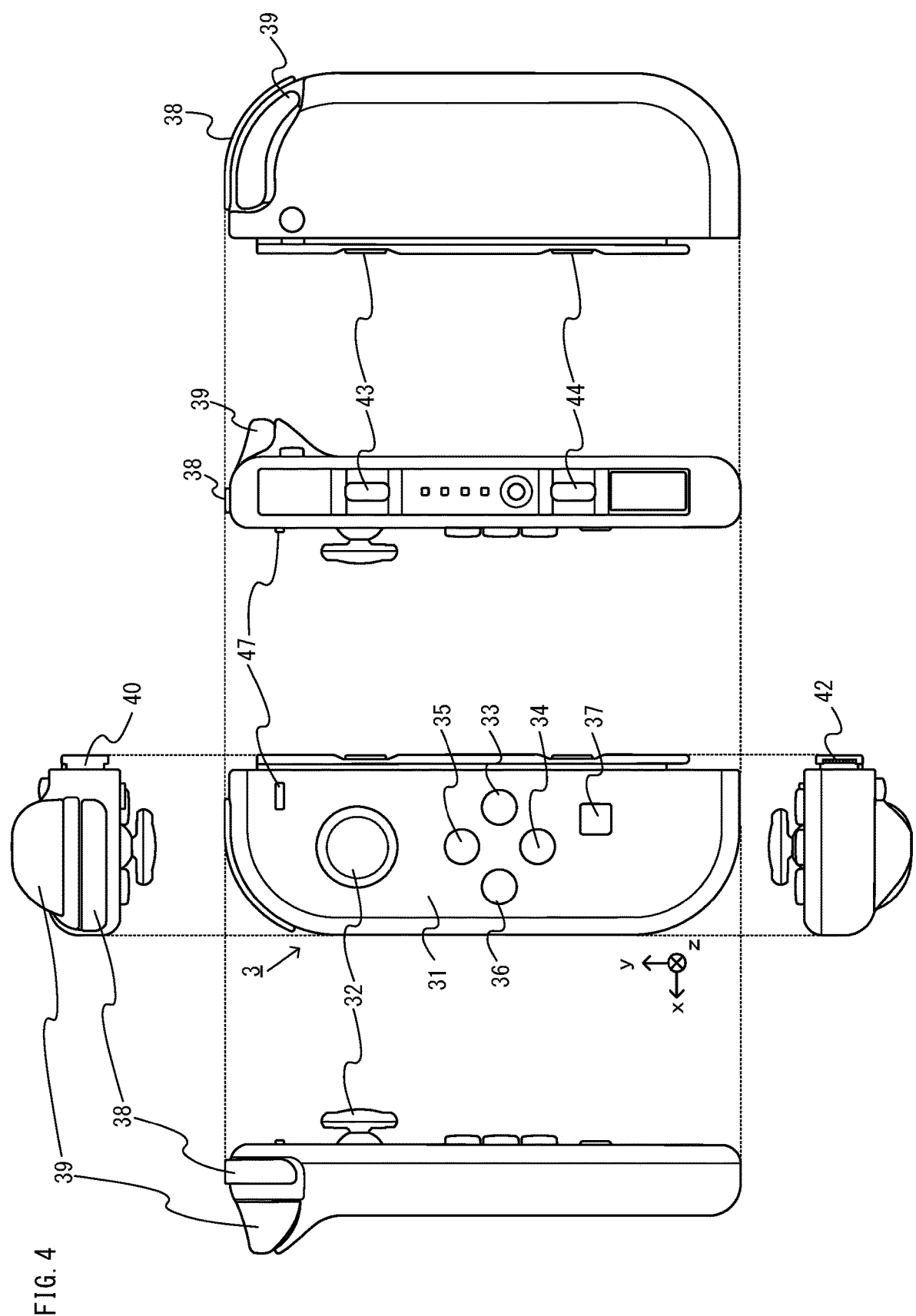
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In this embodiment, the housing 31 has a vertically long shape, that is, is shaped to be long in an up-down direction (i.e., a y-axis direction shown in FIG. 1 and FIG. 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in this embodiment, it is possible to provide an input by pressing the analog stick 32.

The left controller 3 comprises various operation buttons. The left controller 3 comprises four (4) operation buttons 33-36 (specifically, a right direction button 33, a down direction button 34, an up direction button 35 and a left direction button 36) on the main surface of the housing 31. Furthermore, the left controller 3 comprises a record button 37 and a "−" (minus) button 47. The left controller 3 comprises an L-button 38 and a ZL-button 39 in an upper left portion of a side surface of the housing 31. Moreover, the left controller 3 comprises an SL-button 43 and an SR-button 44 on a surface at a side to be attached to the main body apparatus 2 out of side surfaces of the housing 31. These operation buttons are used to input instructions according to various programs (e.g., an OS program and an application program) executed by the main body apparatus 2.

Moreover, the left controller 3 comprises a terminal 42 for the left controller 3 to perform wired communication with the main body apparatus 2.

Figure 5:
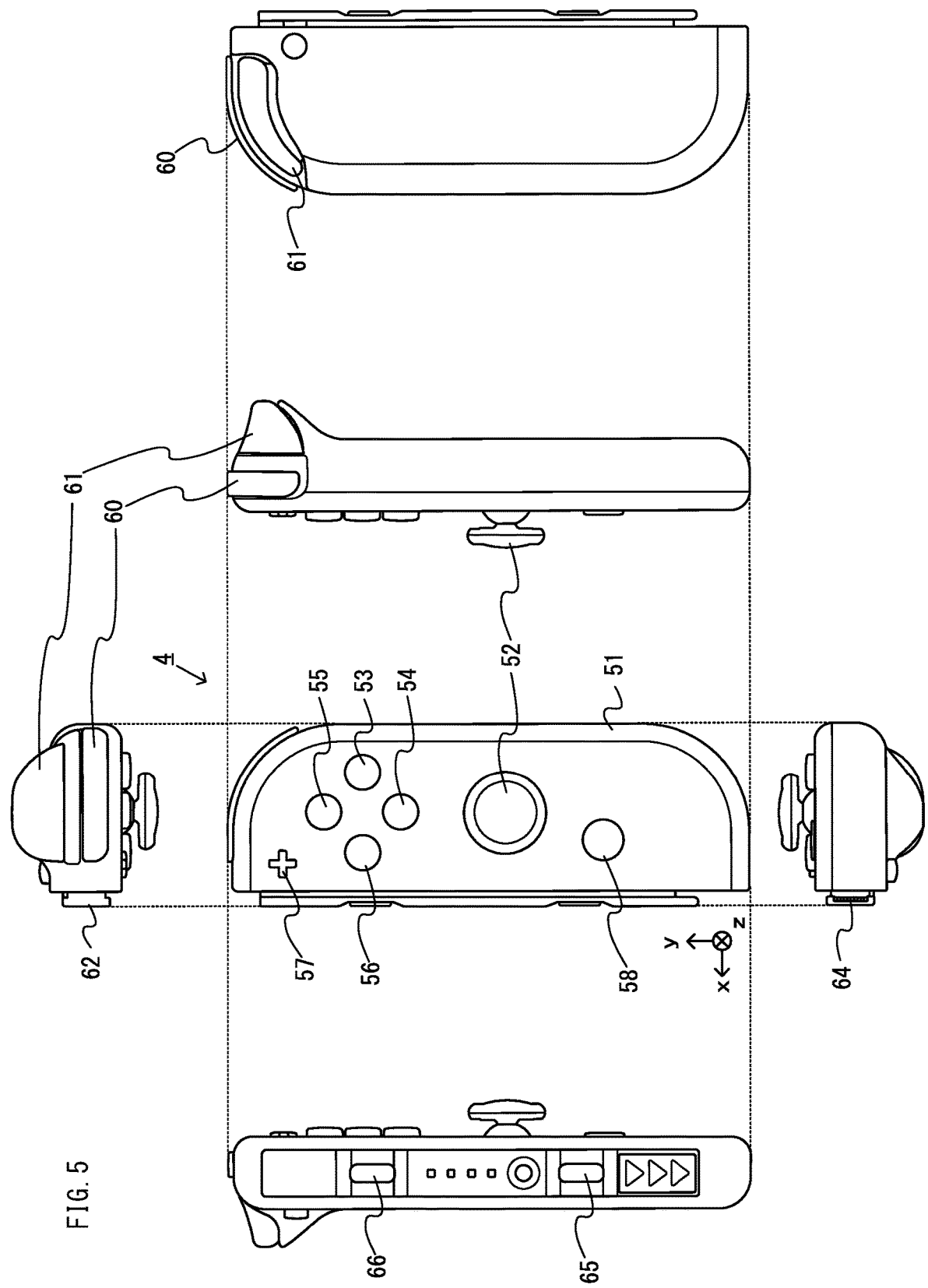
FIG. 5 is sixth orthogonal views showing a non-limiting example right controller shown in FIG. 1 and FIG. 2.

FIG. 5 is six orthogonal views showing an example of the right controller 4. As shown in FIG. 5, the right controller 4 comprises a housing 51. In this embodiment, the housing 51 has a vertically long shape, that is, a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In this embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises an R-button 60 and a ZR-button 61 in an upper right portion of a side surface of the housing 51. Moreover, similar to the left controller 3, the right controller 4 comprises an SL-button 65 and an SR-button 66.

Moreover, the right controller 4 comprises a terminal 64 for the right controller 4 to perform wired communication with the main body apparatus 2.

Figure 6:
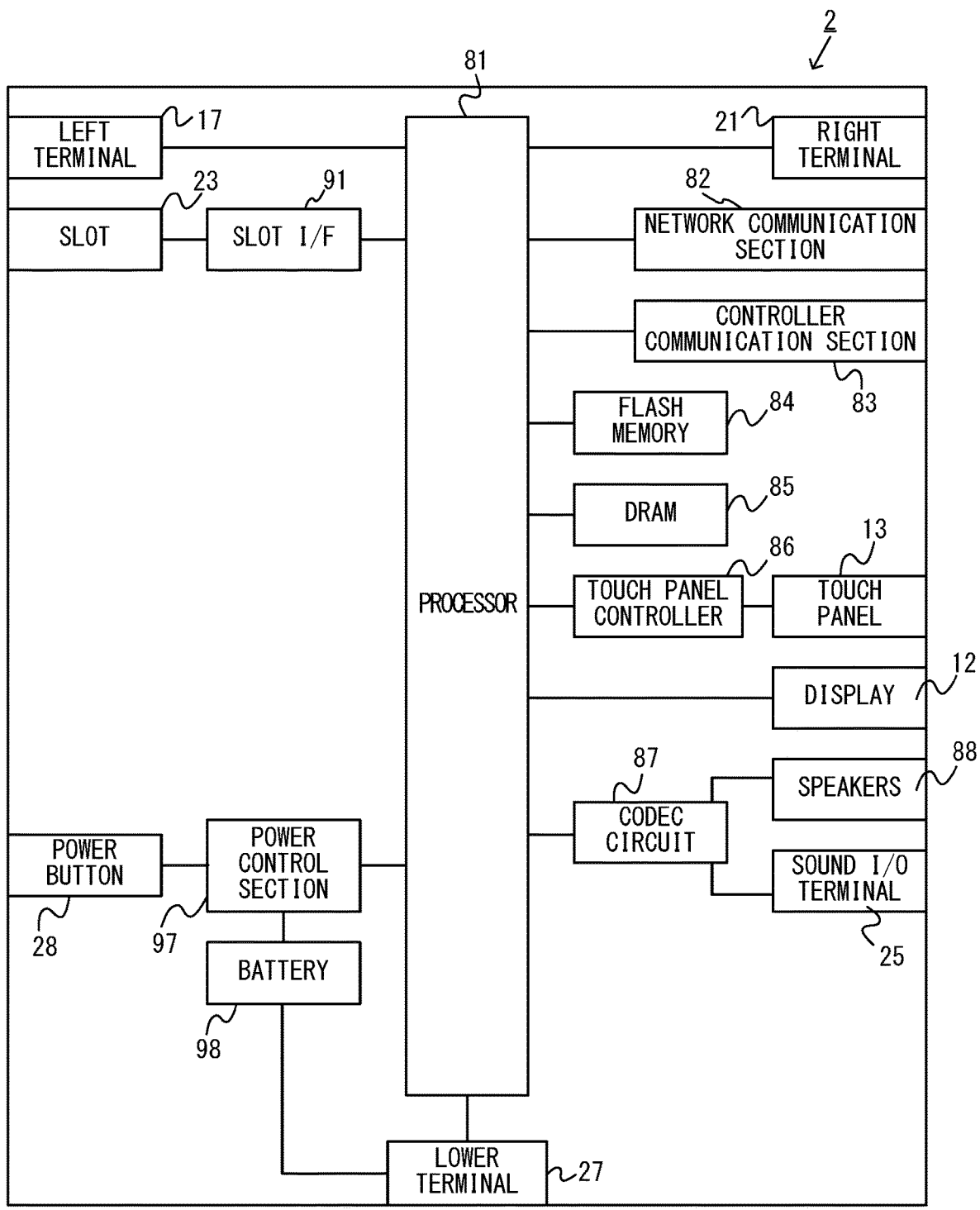
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG. 3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot I/F 91 is connected to the processor 81. The slot I/F 91 is connected to the slot 23, and reads and writes, in accordance with instructions from the processor 81, data from and to the predetermined type of storage medium (e.g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In this embodiment, as a first communication manner, the network communication section 82 is connected to a wireless LAN (Local Area Network) to perform communication with external apparatus by a system in conformity with the Wi-Fi standard. Moreover, as a second communication manner, the network communication section 82 performs wireless communication with a further main body apparatus 2 of the same type by a predetermined communication system (e.g., communication based on a unique protocol or infrared light communication). In addition, the wireless communication in the above-described second communication manner achieves a function of enabling so-called "local communication", in which the main body apparatus 2 can perform wireless communication with further main body apparatus 2 placed in a closed LAN, and a plurality of main body apparatus 2 perform communication directly with each other to transmit and receive data.

The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in this embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives (or acquires) operation data from the left controller 3 via the left terminal 17. Moreover, when performing wired communication with the right controller 4, the processor 81 transmits data to the right controller 4 via the right terminal 21 and receives (or acquires) operation data from the right controller 4 via the right terminal 21. Moreover, when performing communication with the cradle, the processor 81 transmits data to the cradle via the lower terminal 27. Thus, in this embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e.g., display image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e.g., an image generated by performing the above information processing) and/or an externally acquired image on the display 12.

The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e.g., a cradle) is connected to the lower terminal 27, and power is supplied to the main body apparatus 2 via the lower terminal 27, the battery 98 is charged with the supplied power.

Figure 7:
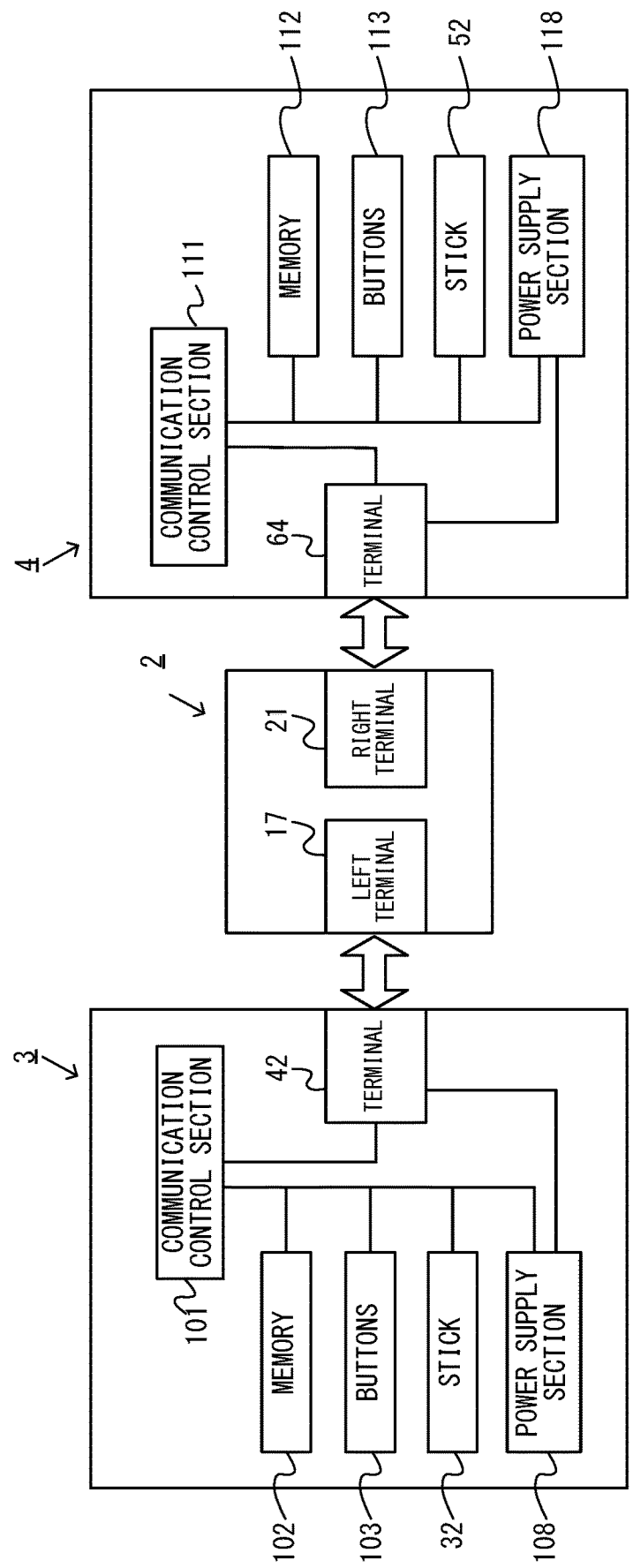
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In this embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2. That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example.

Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every predetermined time period. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data.

The left controller 3 comprises a power supply section 108. In this embodiment, the power supply section 108 has a battery and a power control circuit. Although not shown, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113 and the analog stick 52. These input sections have functions similar to those of the input sections of the left controller 3 and operate similarly to the input sections of the left controller 3.

The right controller 4 comprises a power supply section 118. The power supply section 118 has a function similar to the power supply section 108 of the left controller 3, and operates similarly to the power supply section 108.

An example of a virtual game played in such a game system 1 will be described. The virtual game is a board game, and is also called a competitive game or a multiplayer game that a plurality of players (i.e., multi players) compete against each other. In this virtual game, a plurality of players take turns rolling dice or spinning roulette, and move respective player characters or player objects (hereinafter, simply referred to as "player character") along a movement route from a start point square toward a goal point square. However, when the movement route is a closed loop such as a triangle, a rectangle, a circle, an ellipse, a track shape or an "8 (eight)" character shape, the start point square and the goal point square correspond to each other, and therefore, the player character may start a next round when returning to the start point square. The number of times of rolling dice or spinning roulette (the number of turns) is determined at the time of start of the virtual game.

The movement route is formed in a virtual game space or game field, and a plurality of squares are provided on the movement route. Various types of events are assigned to the squares. As the event, acquiring a virtual coin object (hereinafter, simply referred to as "coin") or losing the coin corresponds. The number of acquiring the coin and the number of losing the coin may be fixedly or variably set. Moreover, as other events assigned to the squares, obtaining an item, playing a mini game and occurring an unexpected-event corresponds.

In the following, a square acquiring a coin may be called a positive square, a square losing a coin may be called a negative square, a square obtaining an item may be called an item square, a square playing a mini game may be called a mini game square, and a square occurring an unexpected-event may be called an unexpected-event square.

Moreover, in addition to the event assigned to the square, there are events such as stopping at the positive square, stopping at the negative square, stopping at the item square, stopping at the unexpected-event square, stopping at the mini game square, winning a mini game, and stopping at the item square.

In addition, the types of the above-described events are examples, and it does not need to be limited. The types and number of events may be more or less.

Moreover, the coin may be acquired or lost dependent on a victory or defeat of a mini game played by the payer. However, the player character may acquire the coin from a player character used by an opponent player (hereinafter, referred to as "opponent character"), or may be deprived of the coin by the opponent character. Moreover, the player character may exchange for the opponent character the coin possessed. Furthermore, the player character may lose some or all of the coins possessed due to occurrence of an unexpected-event.

Moreover, one or more star objects (hereinafter, referred to as "star") are arranged onto each of a plurality of positions of the movement route, and the player character can obtain the star when passing through the position that the star is arranged. However, the player character consumes the coins of the first predetermined number (for example, 20 (twenty)) in order to obtain the star. The star is an object for determining the victory or defeat of the virtual game, and the victory or defeat of the virtual game is determined based on the number of possessed stars when the play of the virtual game is ended. A final ranking order of the virtual game is determined in descending order of the number of the stars possessed. However, when the number of the stars possessed is the same, the ranking of the player character having the larger number of coins is determined to be higher place. That is, the number of the stars possessed and the number of the coins possessed are values for determining the victory or defeat of the virtual game, i.e., an evaluation value.

However, the star may be obtained or lost dependent on the victory or defeat of a mini game played by the payer. Moreover, the player character may obtain the star from the opponent character, or may be deprived of the star by the opponent character. Furthermore, the player character may exchange for the opponent character the star possessed. Furthermore, the player character may lose some or all of the stars possessed due to occurrence of an unexpected-event.

The above-described virtual game is played in a manner that the processor 81 of the main body apparatus 2 performs game control processing based on the operation data according to an operation input of each of a plurality of players participating in the virtual game or according to operation inputs of two or more players participating in the virtual game, so that the game image and the game sound are generated based on a result of the game control processing, and the generated game image is displayed on the display 12 and the generated game sound is output to the speaker 88.

Moreover, in the main story (game part) of the virtual game, the game play of the board game is performed and the final ranking of the board game is determined. When ending the main story of the virtual game, a result of the virtual game is displayed. That is, a part of a result announcement is performed. The result announcement of the virtual game will be described in detail later.

Moreover, in the virtual game of this embodiment, the number of persons who play the virtual game (for example, two to four (2-4) persons) and a matching method are selected in a selection screen prior to a start of the main story. As the matching method, a single-machine match that no communication is performed, a local match, a friend match and a random match that communication is performed.

In the single-machine match, a virtual game is played using a single main body apparatus 2 with no communication. As described above, in the game system 1, since the left controller 3 and the right controller 4 are respectively attachable to or detachable from the main body apparatus 2, when using the left controller 3 and the right controller 4 separately from the main body apparatus 2, the controller that each player uses is also determined at the time of the start of the main story of the virtual game. However, when three or more persons play a virtual game, a further controller different from the left controller 3 and the right controller 4 is used. In a case where the left controller 3 and the right controller 4 are used different players, respectively, the right direction button 33 of the left controller 3 functions as an X button, the down direction button 34 functions as an A button, the up direction button 35 functions as a Y button, and the left direction button 36 functions as a B button. Moreover, when the further controller is to be used, using the further controller is also set at the time of the start of the main story of the virtual game.

In the local match, a virtual game is played by performing wireless communication directly or performing communication via LAN (Local Area Network) with the game apparatus of the opponent player (in this embodiment, a further main body apparatus 2). When performing communication via the LAN, the main body apparatus 2 performs local communication with the further main body apparatuses 2.

In the friend match, a virtual game (i.e., an online game) is played while the main body apparatus 2 of the player performs communication via WAN (Wide Area Network) with a further main body apparatus 2 of the friend player who is the opponent player. The friend player means a player registered into the main body apparatus 2 as a friend. The player registered into the main body apparatus 2 as a friend means a player whose player name and connection information for establishing a connection state for communication are registered into the main body apparatus 2. Here, a friend is a relationship established based on mutual consent between the players. A friend is established when one player applies a friend request to the other player requesting establishment of a friend, and the other player approves the friend request. Alternatively, it is established when both players apply a friend request to each other. The players who are friends can share information mutually, such as transmitting and receiving data using respective main body apparatuses 2.

Moreover, when performing communication via the WAN, the main body apparatus 2 performs communication with an external apparatus by accessing the wireless LAN and the internet. In the following, the communication via the WAN may be referred to as "internet communication".

In the random match, a virtual game (i.e., an online game) is performed while the main body apparatus 2 of the player performs the internet communication with the further main body apparatus 2 used by the opponent player who is selected randomly.

In this embodiment, in a case of the single-machine match and the local match, it is assumed that the opponent player is an acquaintance or has a relationship with the player regardless of whether the opponent player is registered as a friend. In the local match, the main body apparatus 2 of the player searches a further main body apparatus 2 within the LAN so as to participate in a virtual game.

Moreover, in a case of the friend match, the main body apparatus 2 requests a server that matches the opponent player (hereinafter, referred to as a "matching server") to perform the friend match, that is, to select a friend player who is an opponent player. The matching server searches a friend player registered into the main body apparatus 2 of the player who requests to perform the friend match, and selects a plurality of players who participate in a virtual game of the friend match. When selecting (or determining) a plurality of players who participate in the virtual game of the friend match, the matching server transmits information on the opponent players to the main body apparatus 2 that each player uses. In a case of the friend match, if the player name is transmitted as the information on the opponent payer, a connection state is established with the main body apparatus 2 of each of other players participating in the virtual game of the friend match using the registered connection information.

In a case of the random match, the main body apparatus 2 requests the matching server to perform the random match, that is, to select an opponent player randomly. The matching server searches other players except the friend player, that is, the player registered in advance into the main body apparatus 2 of the player requesting to perform the random match, thereby to randomly select a plurality of players participating in a virtual game of the random match. When selecting (or determining) a plurality of players who participate in the virtual game of the random match, the matching server transmits information on the opponent player to the main body apparatus 2 that each player uses. In the random match, the player name and the connection information are transmitted as the information on the opponent player, and the main body apparatus 2 used by each player establishes a connection state with the main body apparatus 2 of each of other players participating in the virtual game of the random match using the received connection information.

In this specification, when there is no necessity of distinguishing the local communication and the internet communication from each other, a term "communication" is simply used. Moreover, when there is no necessity of distinguishing the virtual games of the local match, the friend match and the random match therebetween, a term "communication game" is simply used.

Moreover, in the virtual game of the single-machine match, the main body apparatus 2 detects the operation data from the controller that each player uses, and performs the game control processing of the virtual game based on the detected operation data. However, as the controller, the left controller 3 and the right controller 4 are used when the number of players is two (2), and when the number of players is three (3) or four (4), the left controller 3, the right controller 4 and one or two further controllers each having an equivalent function are used.

In the communication game, the main body apparatus 2 detects the operation data from the left controller 3 and the right controller 4 that the player uses, and receives the operation data transmitted from other main body apparatuses 2 that the opponent players use, and performs the game control processing of the virtual game based on the detected operation data and the received operation data. Therefore, in a case of the communication game, the main body apparatus 2 transmits, when detecting the operation data from the left controller 3 and the right controller 4 that the player uses, a copy of the detected operation data to other main body apparatuses 2 that the opponent players use.

In addition, in this embodiment, in a case of the communication game, the main body apparatus 2 that the player uses transmits or receives the operation data to or from other main body apparatuses 2 that the opponent players use, so that the game control processing of the virtual game is performed in each of the plurality of main body apparatuses 2 playing the communication game. However, any one main body apparatus 2 of the plurality of main body apparatuses 2 playing the communication game is made to serve as a parent machine and one or two more further main body apparatuses 2 are made to serve as a child machine, and the operation data may be transmitted to the parent machine from each child machine and result data of a result of having performed the game control processing in the parent machine may be transmitted to the each child machine.

In this embodiment, after the main story of the virtual game of the random match is ended, prior to processing for a result announcement part is performed, processing of the evaluation part performing the evaluation of the main story of the virtual game is performed. However, the evaluation of the main story of the virtual game is performed by the players having played the virtual game of the random match. Such evaluation of the main story of the virtual game may be evaluation to the content of the random match, and may be evaluation to the player who participated in the random match. Moreover, what performs the evaluation is a human player. Therefore, the computer player does not perform the evaluation. Moreover, since the evaluation is performed after the main story of the virtual game of the random match is ended, the player who stops playing the virtual game of the random match midway also does not perform the evaluate. Although a detailed description is omitted, in the random match, the player can secede from the random match temporarily by changing to the computer player temporarily. It is possible to perform the evaluation even if seceding from the random match temporarily. Therefore, the player who can perform the evaluation on the main story of the virtual game is a human player who played the main story of the virtual game without stopping midway.

In addition, although only when the random match is performed evaluation processing described later in this embodiment, such evaluation may be performed in a case where the single-machine match, the local match or the friend match is performed.

Moreover, in the random match, changing into the computer player temporarily or stopping midway may be performed by the player intentionally, or may be done unintentionally due to disconnection of communication or the like. However, the character or object controlled by the computer player is a non-player character or non-player object. Therefore, if changed to the computer player from the human player during playing the virtual game, the player character is changed to a non-player character or non-player object.

Figure 8:
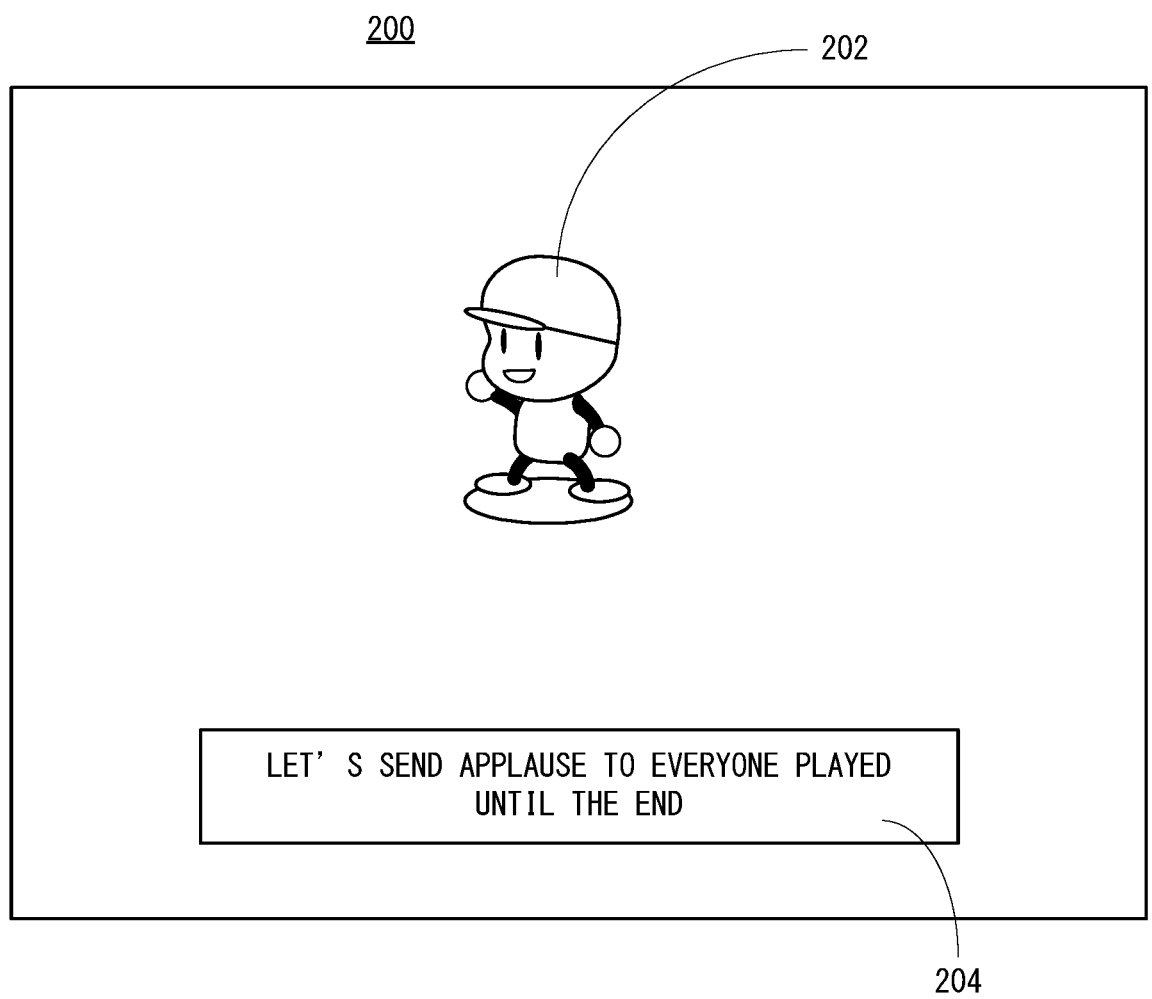
FIG. 8 is a view showing a non-limiting example evaluation screen at start time.

FIG. 8 is a view showing a non-limiting example evaluation screen 200 at the time of start of the evaluation processing displayed on the display 12 of the main body apparatus 2. The evaluation screen 200 shown in FIG. 8 is a game image displayed at the time of the start of the evaluation processing, and is a game image for explaining or notifying an evaluation method to a user or player (hereinafter, simply referred to as "player").

In the evaluation screen 200 shown in FIG. 8, a guide character 202 is displayed in the center of the screen, and a display frame 204 is provided below the guide character 202. The guide character 202 is a character for advancing or guiding the evaluation processing, and is different from the player characters appearing in the main story of the virtual game. A text explaining the evaluation method is displayed in the display frame 204. In an example shown in FIG. 8, a text "Let's send applause to everyone played until the end" is displayed. Therefore, the player can know performing the evaluation for the main story of the virtual game of the random match.

Moreover, as described above, in the evaluation screen 200, the guide character 202 different from the player characters is displayed, no player character is displayed regardless a result of the virtual game. Therefore, there does not occur a situation that only a winner of the virtual game is praised. In another example, even if all the player characters participating in the virtual game are displayed in a horizontal line, similarly, the situation is not such that only the winner of the virtual game is praised. That is, the evaluation screen 200 is displayed so that all the players (or all the player characters) may become equal.

Figure 9:
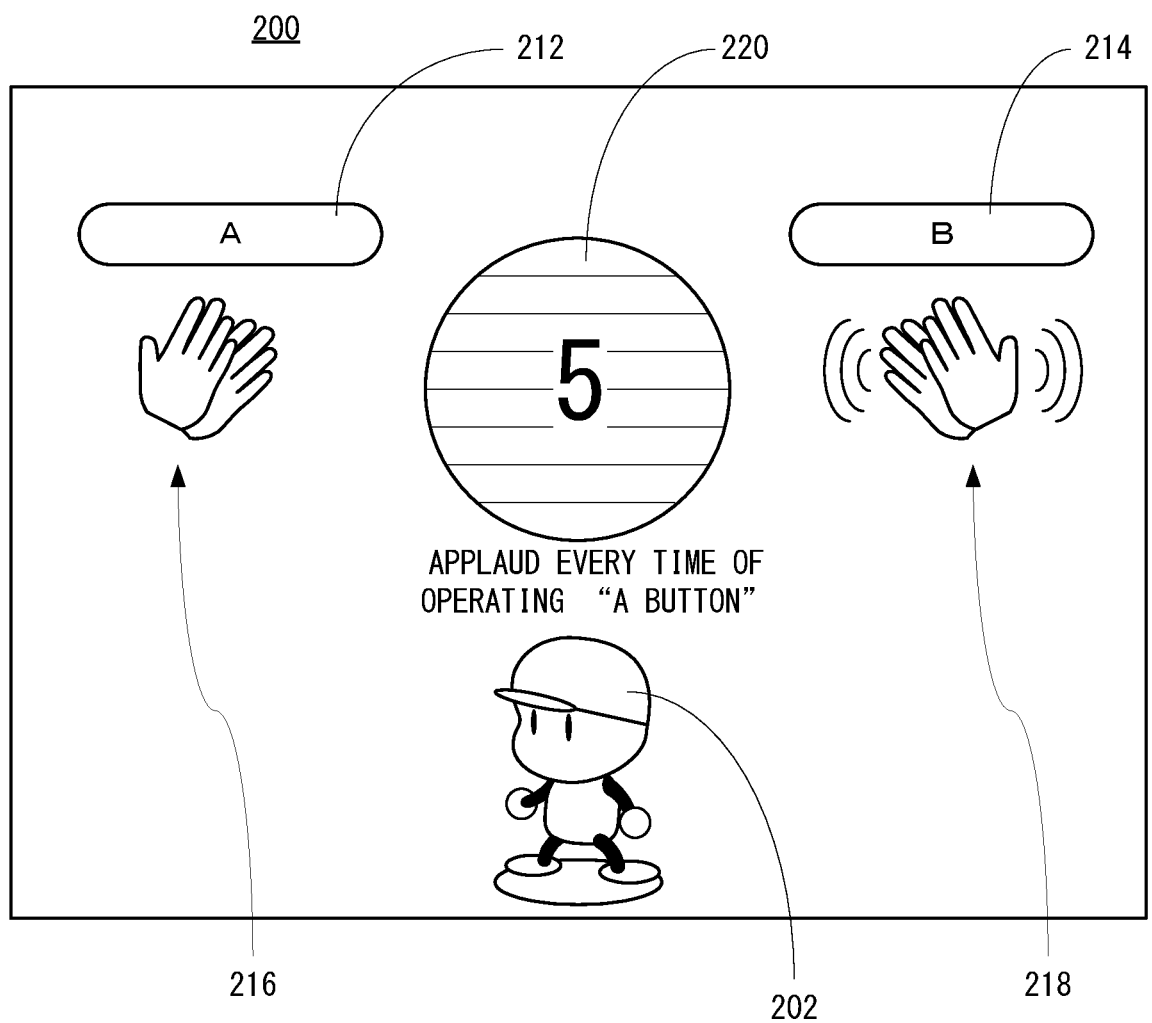
FIG. 9 is a view showing a non-limiting example evaluation screen at runtime.

FIG. 9 is a view showing a non-limiting example evaluation screen 200 displayed on the display 12 of the main body apparatus 2 at the runtime of the evaluation by the players. The evaluation screen 200 of FIG. 9 is a game image at the time of having just started the evaluation by the players. In this embodiment, a case where two players evaluate will be described. However, one of two players is the player and the other is the opponent player. As shown in FIG. 9, when starting the evaluation by the players, in the evaluation screen 200, a designation image 212 and a designation image 214 each of which the player name is indicated are displayed side by side in an upper portion of the screen. A both-hands image 216 is displayed below the image 212 and a both-hands image 218 is displayed below the image 214. Moreover, an image 220 that indicates a total number of applause is displayed between the both-hands image 216 and the both-hands image 218. Furthermore, the guide character 202 is displayed below the image 220, and a text explaining an operation method for the players to applaud is displayed between the guide character 202 and the image 220. In an example shown in FIG. 9, an image of a character string of "Applause at every time of operating "A button" is displayed.

The image 212 includes an oval frame image, and "A" is indicated inside thereof as the player name. Similarly, the image 214 includes an oval frame image, and "B" is indicated inside thereof as the player name Each of the both-hands image 216 and the both-hands image 218 is a drawing object (corresponding to "second drawing object) imitating the both hands of the human, and the both-hands image 216 is corresponding to the player having the player name indicated inside the oval frame image 212, and the both-hands image 218 is corresponding to the player having the player name indicated inside the oval frame image 214. Hereinafter, the player having the player name "A" will be called "player A", and the player having the player name "B" will be called "player B".

If the player performs an evaluation input, that is, if the player operates the A button 53, the both-hands image 216 or the both-hands image 218 corresponding to this player is displayed as if performing applaud. When the player does not operate the A button 53, the both-hands image 216 or the both-hands image 218 corresponding to this player is not changed. Therefore, the player can know that the evaluation input is being performed, that is, applauding by own operation by seeing the both-hands image 216 or the both-hands image 218 corresponding to this player. Moreover, the player can praise himself/herself and other players with natural action such as applause. Therefore, it is possible to raise the degree of satisfaction of the player participating in the virtual game of the random match.

However, the both-hands image 216 or the both-hands image 218 corresponding to this player is displayed when the player operates the A button 53, and the both-hands image 216 or the both-hands image 218 corresponding to this player is not displayed when the player does not operate the A button 53, whereby a manner of applauding may be expressed.

Thus, as an image indicating that there is the evaluation input, an image capable of expressing an action that is natural to have a quantity of three or more steps is set.

In addition, in this embodiment, although the player can applaud by operating a button such the A button 53, it does not need to be limited to this. In another example, the player can applaud by a motion operation of shaking the controller (also including a case where the controller is attached to the main body apparatus 2), or by a sound input through a microphone. However, in a case of enabling a motion operation, a motion sensor (for example, an acceleration sensor and/or a gyroscope sensor) is provided in the controller (3, 4), and it is determined whether the controller is shaken based on an output of the motion sensor. Moreover, in a case of enabling the sound input, a microphone is connected to the sound input/output terminal 25, a sound that is input through the microphone is detected, and it is determined whether there is a sound input based on a volume of the detected sound. For example, in a case of inputting the sound through the microphone, the player utters "clap crackle" or actually claps to generate a "crackle crackle" sound.

The image 220 is a drawing object (corresponding to "first drawing object") for displaying a total of the numbers of applause that is designated by all the players performing the evaluation (hereinafter, referred to as "total number"), and an image of a numeric character indicating the total number is displayed inside a ring-like frame image. For example, the evaluation screen 200 of FIG. 9 is an image of an early stage when the evaluation by the players is started, and "5" is displayed as the total number. The total number is updated at each time the player applauds, and the image of the numeric character inside the frame image of the image 220 is also updated. Therefore, the player can know the progress of the total number of applause, and it is possible to encourage more applause to the players.

However, the image of numeric character of the total number may be displayed from the middle of a second predetermined time period described later or after elapsing the second predetermined time period. Moreover, instead of the image of the numeric character indicating the total number, a bar extendable according to the total number may be displayed, or an image of a predetermined shape or character that the number increases according to the total number may be displayed, or an inside of the frame image may be filled with a color different from a background color according to the total number. That is, the total number of applause may be represented by means other than numeric characters.

Moreover, in order to make it clear that the numeric character is the total number of applause, not only the image of the numeric character of the total number but also a both-hands image similar to the both-hands images 216 and 218 may be displayed inside the frame image of the image 220 so as to applaud at each time the total number is incremented.

Moreover, inside the frame image of the image 220, a predetermined color (red, as an example) is applied as a background color of the image 220. The image 220 shown in FIG. 9, it is represented that red is attached inside the frame image by drawing a plurality of horizontal lines inside the frame image. Moreover, the background color of the image 220 is changed according to the total number. In this embodiment, when the total number is zero to ninety-nine (0-99), the background color is red, and the background color is blue when the total number is a hundred (100) or more. Therefore, the player can know whether the total number is less than a hundred (100) or a hundred (100) or more by the color attached to the image 220.

However, although the background color of the image 220 is changed according to the total number in this embodiment, a shape and/or a size of the image 220 may be changed. Moreover, a thickness and/or a color (including a pattern) of the image 220 itself may be changed. Furthermore, a predetermined drawing object (for example, an image of a love heart) capable of ornamenting the image 220 may be displayed on an inner side or outer side of the image 220 according to the total number. These modifications may be adopted complexly.

Moreover, in FIG. 9, the player B applauds and the both-hands image 218 corresponding to the player B is displayed so as to applaud. In this embodiment, a time period that the players perform the evaluation is determined as the second predetermined time period (for example, seven to ten (7-10) seconds). That is, an upper limit of the time period capable of performing an operation to applaud is set. Therefore, it is possible for the player to continue applauding if within the second predetermined time period. That is, the number of times of applause is not provided with an upper limit.

As shown in FIG. 9, the number of the applause for each player is not displayed in the evaluation screen 200. Therefore, competition between the players regarding the number of applause is not generated, and thus the degree of satisfaction for the players participating in the virtual game of the random match can be improved regardless of the number of applause.

Moreover, in this embodiment, the player can applaud at each time of operating the A button 53, and therefore, the number of operation times of the A button 53 is in agreement with the number of applause. That is, it is possible to evaluate not only whether to evaluate (1 or 0) but also by three steps of values. Therefore, the player can determine also a degree of evaluation. It means that the larger number of applause, the higher evaluation (positive evaluation).

However, in another embodiment, only whether to evaluate may be input. Moreover, although the applause is performed at each time of operating the A button 53, by long-operating the A button 53, applause may be performed by converting the length of time the A button 53 is long-operated into the number of times of applause. Moreover, although the A button 53 is operated, a numeric value within a predetermined range (0-100, for example) may be input. When long-operating the A button 53 or inputting a numeric value, not only an integer but a numeric value below a decimal point may be input. In this way, the intention of the player can be reflected more accurately.

Moreover, it may be made to perform negative evaluation. For example, an operation of the B button 54 performs negative evaluation, and the number of operation times of the B button indicates a degree of negative evaluation. In this case, a drawing object of a hand (one hand or both hands) for booing is displayed at each time the B button 54 is operated. As an example, in a case where the negative evaluation is performed, at the time of calculating the total number of applause, the number of applause is subtracted according to the number of negative evaluation.

Although illustration is omitted, when three players perform the evaluation, a display frame and a both-hands image are further displayed below the both-hands image 216, and when four players perform the evaluation, a display frame and a both-hands image are further displayed below the both-hands image 216 and a display frame and a both-hands image are further displayed below the both-hands image 218.

Figure 10:
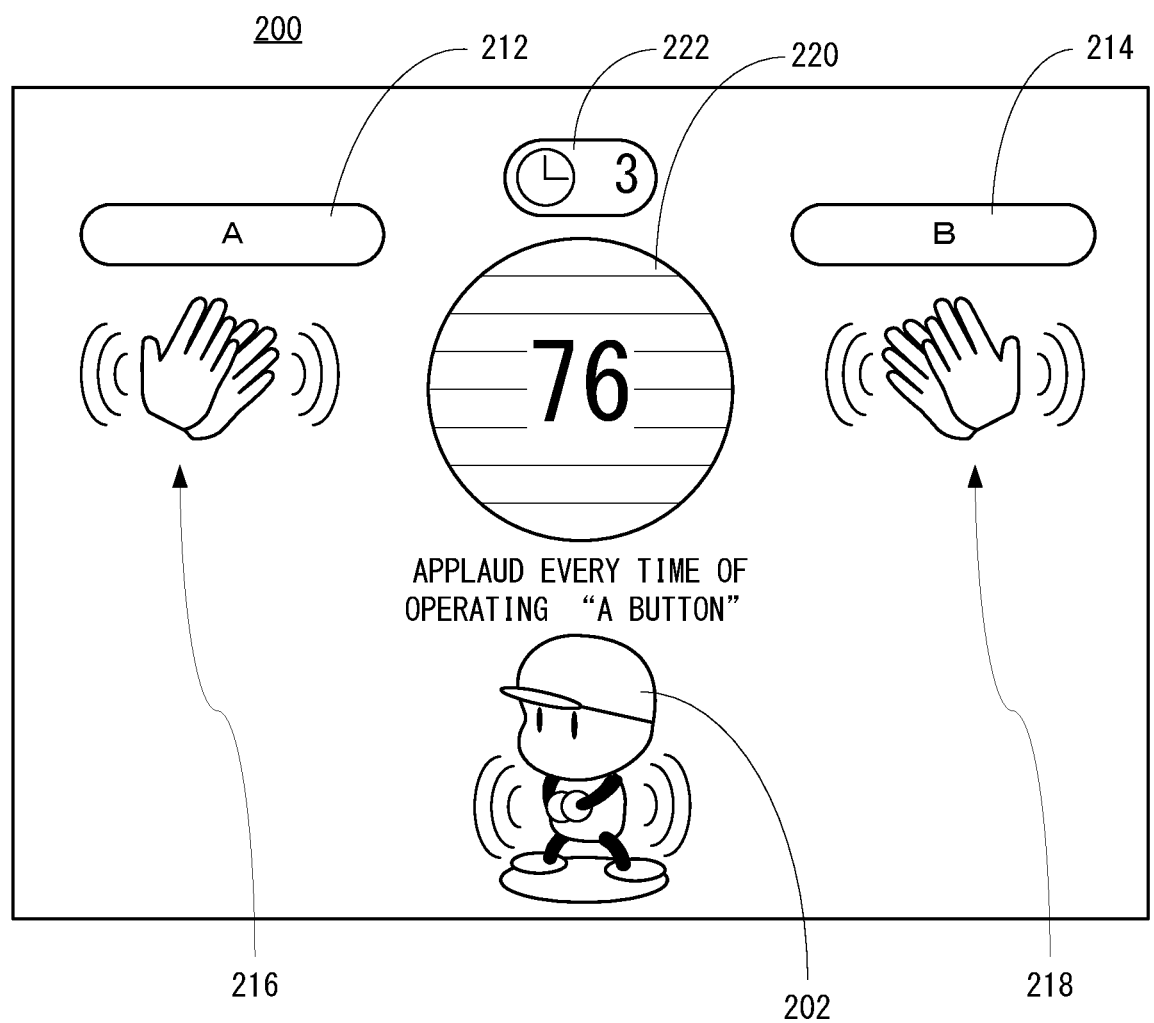
FIG. 10 is a view showing another non-limiting example evaluation screen at runtime.

FIG. 10 is a view showing a non-example evaluation screen 200 displayed on the display 12 of the main body apparatus 2 in a final stage at the runtime of the evaluation by the player. The evaluation screen 200 of FIG. 10 is a game image when the evaluation by the player approaches an end. In the following, the evaluation screen 200 shown in FIG. 10 will be described, but as to the contents having been described using FIG. 9, a description will be omitted.

In FIG. 10, the evaluation screen 200 at the time of a remaining time period becomes three (3) seconds within the second predetermined time period is indicated. If the remaining time period becomes three (3) seconds as shown in FIG. 10, an image 222 is displayed above the image 220. An image 222 is an image for displaying the remaining time period. The image 222 includes a horizontally long oval frame, and inside the frame image, an image of a clock and an image of numeric character indicating of the remaining time period (here, a number of seconds) are displayed.

Moreover, in an example shown in FIG. 10, the player A applauds, and the both-hands image 216 corresponding to the player A is displayed as if also applauding. Applause is further performed from a state shown in FIG. 9, and the total number inside the frame image of the image 220 is changed to "76".

Furthermore, as shown in FIG. 10, in the evaluation processing, the guide character 202 also applauds. Therefore, the guide character 202 is displayed as if applauding. While the guide character 202 is applauding, the total number is added. In this embodiment, the guide character 202 is displayed to applaud once every third predetermined time period (for example, few or several frames) that is shorter than the second predetermined time period. However, the frame is a screen update time, which is 1/60 seconds, for example. In addition, a second predetermined number (for example, 50) is added to the total number by the guide character 202 applauding.

A reason why the guide character 202 thus applauds by the second predetermined number (corresponding to the "supplement amount") is that even when all the players do not applaud, at least the minimum number of positive evaluation is to be performed. As described later, the in-game currency (different from the coin) according to the total number of applause is given to the player who plays the virtual game of the random match, and therefore, the second predetermined number is added to the total number as a participation award for playing the virtual game of the random match. The player who stops playing the virtual game of the random match midway cannot applaud in the evaluation processing and also is not given the in-game currency.

Moreover, since the guide character 202 sends the second predetermined number of applause to respective players even when all the players do not applaud or the players applaud lesser, it is possible to make the evaluation processing appear to be lively.

In addition, when the player stops playing the virtual game midway, the computer player plays the virtual game instead.

Moreover, although the guide character 202 applauds by the second predetermined number (or a fixed number) in this embodiment, the number the guide character 202 applauds may be set randomly.

Furthermore, although the computer player is made not to applaud in this embodiment including a case of replace temporarily, it may be set that the computer player can applaud you may make it applaud with a fixed number or a number randomly set like the guide character 202.

Figure 11:
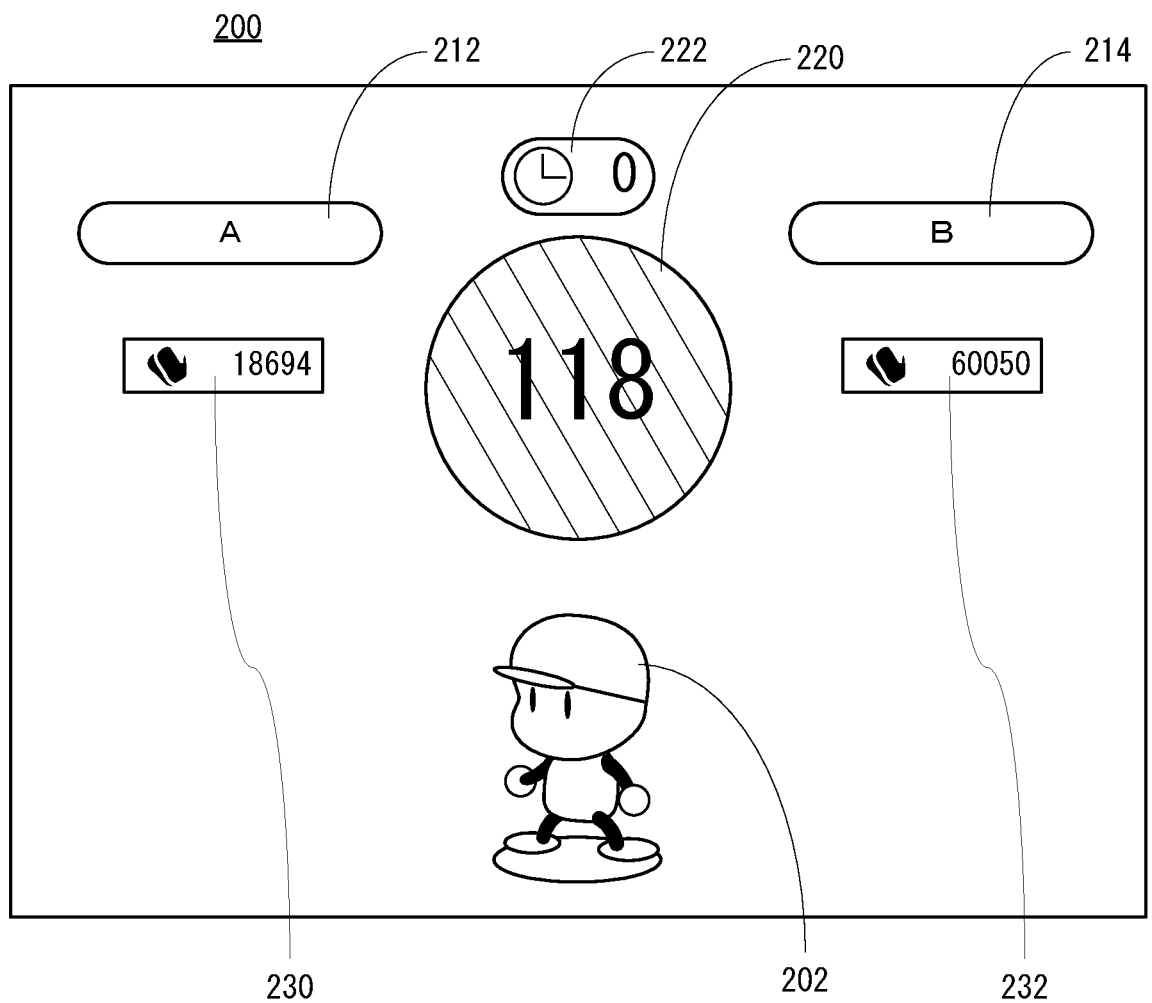
FIG. 11 is a view showing a non-limiting example evaluation screen displaying an accumulated number.

FIG. 11 is a view showing a non-limiting example evaluation screen 200 displayed on the display 12 of the main body apparatus 2 when the evaluation by players is ended. In the following, the evaluation screen 200 shown in FIG. 11 will be described, but as to the contents having been described using FIG. 9 and FIG. 10, a description will be omitted.

FIG. 11 shows after elapsing the second predetermined time period and thus the remaining time period becomes zero (0) seconds. As shown in FIG. 11, if the remaining time period becomes zero (0) seconds, a numeric character inside the frame image of the image 222 becomes "zero (0)", and instead of the both-hand image 216 and the both-hands image 218, an image 230 and an image 232 are displayed as drawing objects for displaying the number of applause. In the image 230 and the image 232 shown in FIG. 11, a both-hands image attached with a predetermined color (black, in FIG. 11) to indicate accumulated values (hereinafter referred to as "image indicating accumulated value") and the accumulated numbers or accumulated values of the number of applause for player A and the player B are displayed inside rectangular frame images. In an example shown in FIG. 11, the accumulated value of the number of applause of the player A is "18694", and the accumulated value of the number of applause of the player B is "60050".

In this embodiment, the accumulated value is a value accumulating the total number of applause of all the players that perform the evaluation in respective games of the past random match of the corresponding player, and is stored for each player. Therefore, it can be seen that the larger the number of accumulated value, the higher possibility of a larger number of times that the player has played the virtual games in the random match. That is, it can be also seen that there is a high possibility that the player is a veteran player in the random match.

Although a detailed description is omitted, each player can create their own profile card in the virtual game of this embodiment, and each player can see the profile card of the opponent player prior to the start of the random match. Data of the profile card is transmitted to the matching server when directing the matching server to perform the random match from the main body apparatus 2, and then, the matching server selects a plurality of players participating in the virtual game of the random match, and when matching server transmits the information of the opponent player to each the main body apparatus 2 used by each of the players, the information may be transmitted with including data of the profile card. Alternately, when the main body apparatus 2 used by each player participating in the virtual game of the random match establishes, using the connection information received from the matching server, a connection state with the main body apparatus 2 of each of other players participating in the virtual game of the random match, the data of the profile card may be exchanged.

If the accumulated value is included as information of this profile card, each player can know whether the player of an opponent player is a veteran player by seeing the profile card of the opponent player. By showing that the player is a veteran player numerically by thus making the accumulated value be included in the information of the profile card, it is possible to give to each player a challenge to play the virtual game of the random match, and to give to the opponent player a sense of security.

Moreover, if the information of the profile card includes not only the accumulated value but also the number of playing times of the virtual game of the random match, it is possible to estimate whether the opponent player is an excellent player based on the two pieces of such information.

For example, when there is much number of playing times of the virtual game of the random match, and thus, in proportion to this, the accumulated value is large, it is possible to determine that the player is an excellent player who rarely stops in the middle the virtual game of the random match.

Moreover, when there is less number of playing times of the virtual game of the random match, and thus, the accumulated value is small, it is possible to determine that the player is a player who has largely played the single-machine match, the local match or the friend match or a player who just purchased game software.

Moreover, when there is much number of playing times of the virtual game of the random match but the accumulated value is small, it is possible to determine that the player is not excellent player who often stops in the middle the virtual game of the random match. When a player not excellent is selected as the opponent player, the player may direct the matching server redo the selection of the opponent player. However, the game software or the matching server may determine whether to let a player participate in the virtual game of the random match by considering the number of playing times of the virtual game of the random match and the accumulated value for each player.

Moreover, in an example shown in FIG. 11, the applause is further sent from a state shown in FIG. 10, and the total number displayed in the image 220 is changed to "118". Therefore, the background color of the image 220 is changed to blue. In FIG. 11, it is represented that the background color is blue by drawing slant lines inside the frame image of the image 220.

Figure 12:
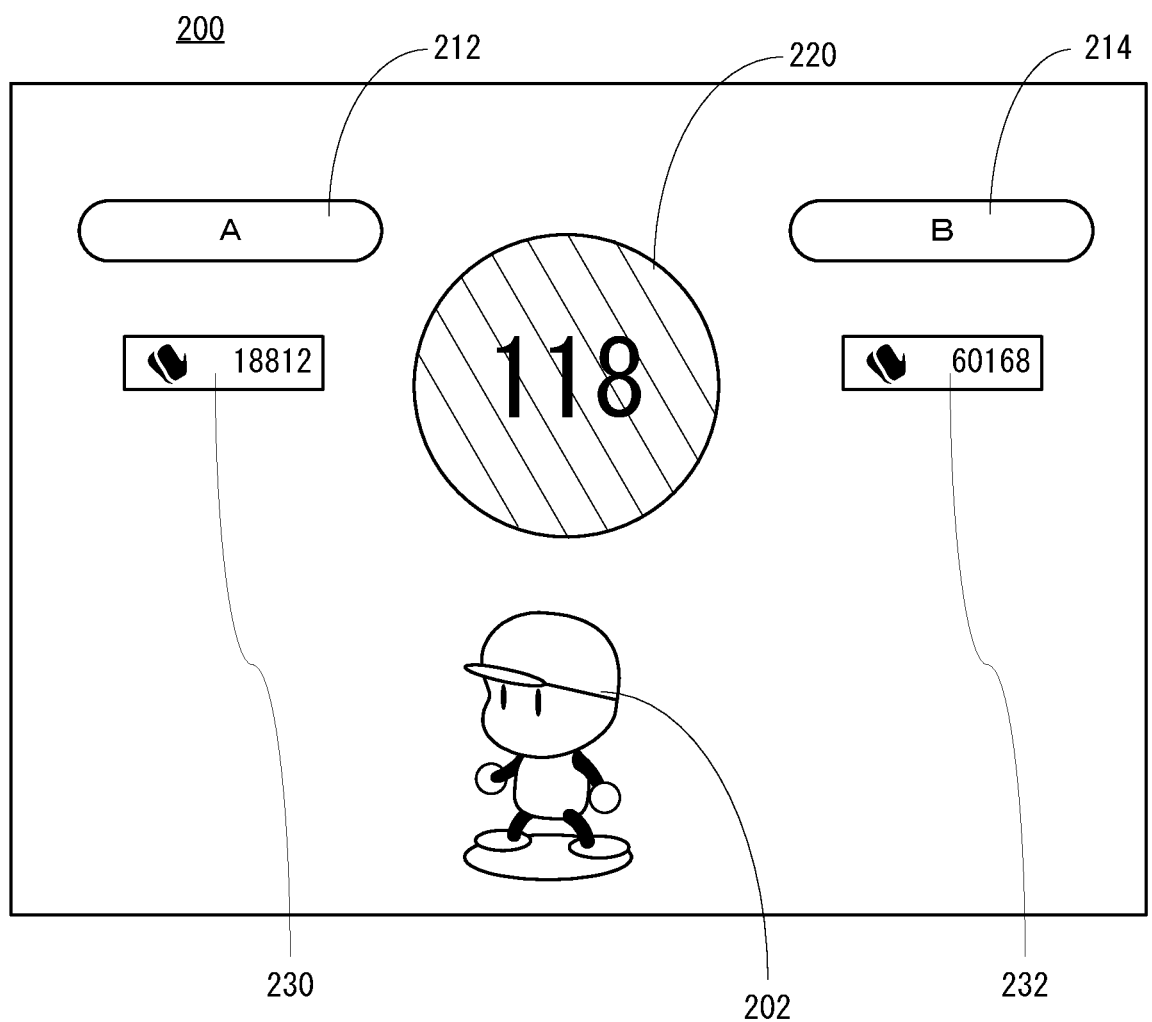
FIG. 12 is a view showing a non-limiting example evaluation screen displaying an updated accumulated number.

FIG. 12 is a view showing a non-limiting example evaluation screen 200 displayed on the display 12 of the main body apparatus 2 after the total number is added to the accumulated value. In the following, the evaluation screen 200 shown in FIG. 12 will be described, but as to the contents having been described using FIG. 8-FIG. 11, a description will be omitted.

FIG. 12 shows the evaluation screen 200 that the accumulated value is updated by adding the total number this time to the accumulated value. In this evaluation screen 200 shown in FIG. 12, the image 222 is undisplayed (or deleted). Moreover, as shown in FIG. 12, images of numeric characters for the accumulated value and the updated accumulated value are displayed inside frame images of the image 230 and the image 232. In an example shown in FIG. 12, the updated accumulated value of the number of applause of the player A is "18812", and the updated accumulated value of the number of applause of the player B is "60168". That is, since the same number (in this embodiment, total number) is added to all the players, fairness can be maintained.

In addition, as described above, when it can be made to perform negative evaluation, the accumulated value may be accumulated with a negative value or changed while being increased or decreased.

In this embodiment, when finishing the evaluation by the players, the evaluation screen 200 displaying the accumulated value shown in FIG. 11 is displayed for few or several seconds (for example, approximately three to five (3-5) seconds), and further, after the evaluation screen 200 that the accumulated value is updated shown in FIG. 12 is displayed for few or several seconds (for example, approximately three to five (3-5) seconds), and thereafter, result announcement processing of described later is started. Moreover, in this embodiment, when the total number this time is added to the accumulated value, not only the accumulated value is updated but the in-game currency of the number according to the total number is given to the player (or player character). The in-game currency is an object different from the coin, and held as possessions of the player even if the virtual game is ended.

Furthermore, in the virtual game of this embodiment, the player can be attached with a title according to a magnitude of the accumulated value. For example, a plurality of titles are prepared, and the accumulated value increases, a kind of selectable titles is increased. In another example, the in-game currency may be given according to the magnitude of the accumulated value.

Thus, the in-game currency of the number according to the total number is given, and a title (or in-game currency) is given according to the accumulated value. That is, a reward according to the total number (corresponding to "first reward") is given, and a reward according to the accumulated value (corresponding to "second reward") is given. Therefore, it is encouraged to applaud more.

The title attached to the player is included in the information on the above-described profile card. Therefore, there is an occasion that each player can know based on the title whether the opponent player is a veteran player. Moreover, if the number of times having played the virtual game of the random match is made to be included in the information of the profile card as described above, there is also an occasion that it is possible to estimate whether the opponent player is an excellent player based on two-pieces of information of the title attached to the player and the number of playing times.

Next, a result announcement part will be described. In this embodiment, in a case of the random match, a result announcement is performed after ending the evaluation processing, but in a case of the single-machine match, the local match and the friend match, a result announcement is performed after ending the main story of the virtual game.

Moreover, in this embodiment, a final ranking in the virtual game (hereinafter, referred to as "overall ranking") is announced in the result announcement and a message praising a player for each place of the overall ranking (hereinafter, referred to as "praise message") is displayed, and a confirmation screen 500 (see FIG. 20) of a detailed result is displayed.

However, when the overall ranking is announced, a message on the overall ranking (hereinafter, referred to as "ranking message") is displayed for each place in the overall ranking.

Moreover, in this embodiment, the overall ranking of only the player who uses the main body apparatus 2 is announced in the random match, the praise message only to this player is displayed, and the confirmation screen 500 of a detailed result is displayed. That is, an announcement of the overall ranking and a display of the praise message for the opponent player who uses another main body apparatuses 2 are not performed. Since the opponent player includes a strange player who exists in remoteness in the random match and thus the necessity of getting to know the praise message for an unknown player is not high, by omitting the announcement of the overall ranking and the display the praise message of the opponent player, it is possible to shorten the time period until the confirmation screen 500 of the detailed result is displayed.

Figure 13:
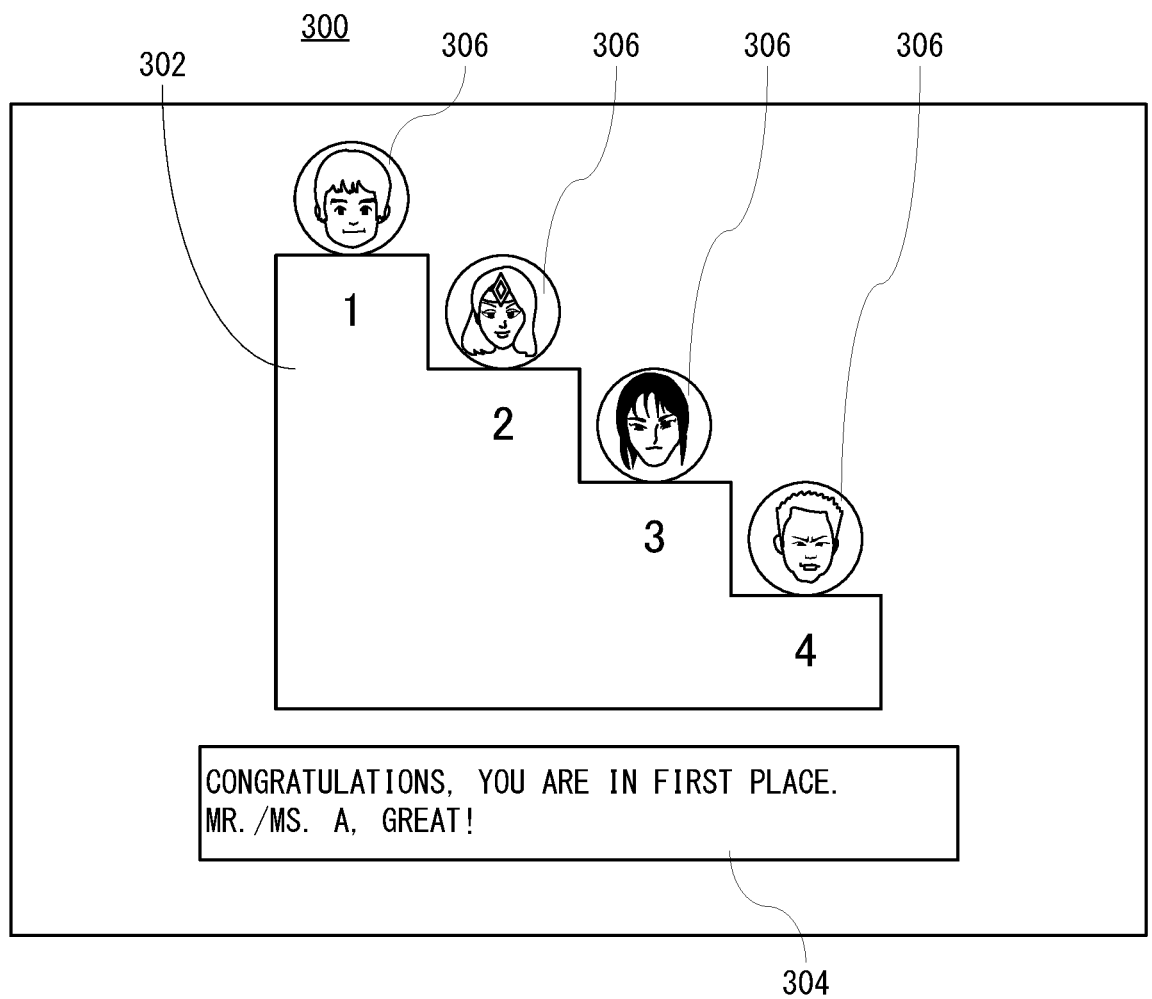
FIG. 13 is a view showing a non-limiting example ranking announcement screen of a first place.

FIG. 13 is a view showing a non-limiting example ranking announcement screen 300 for a first place of the overall ranking. The ranking announcement screen 300 displays a background object 302 imitating a podium in the center thereof, and a display area 304 for displaying a ranking message is provided below the background object 302. The display area 304 is shown by a rectangular frame. Moreover, player character images 306 are displayed according to ranking so as to ride on the background object 302. In this embodiment, the player character image 306 is an image that a face image of the player character is displayed in a ring-like frame image. However, this is an example, and an image of a whole body or an upper half body of the player character may be displayed, and instead of displaying the player character image 306 on the background object 302 being a podium, an image that a player character is to be held with a flag that a numeric character of ranking is indicated may be displayed. A player character image 406 described later is the same or similar to the player character image 306.

An example shown in FIG. 13, a ranking message for the first place of the overall ranking such as "Congratulations. You are in first place. Mr./Ms. A, great!" is displayed in the display area 304. The ranking message and a determination method of the ranking message will be described later.

Figure 14:
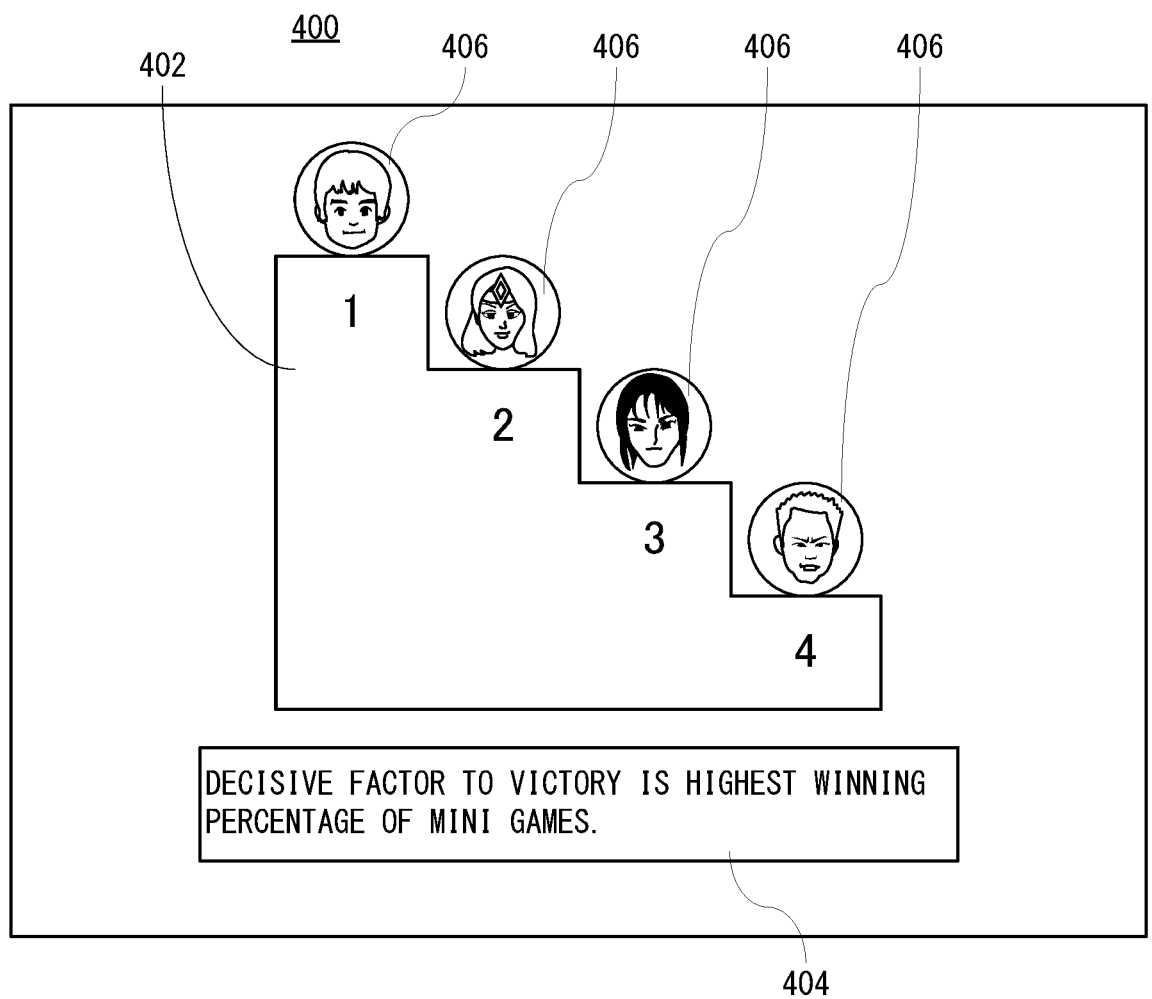
FIG. 14 is a view showing a non-limiting example praise screen to the first place.

FIG. 14 is a view showing a non-limiting example praise screen 400 of the first place of the overall ranking. If the ranking announcement screen 300 of the first place of the overall ranking is displayed for few or several seconds (for example, approximately three to five (3-5) seconds), instead of the ranking announcement screen 300 of the first place of the overall ranking, the praise screen 400 for the first place of the overall ranking is displayed on the display 12. The praise screen 400 is the same or similar to the ranking announcement screen 300, and displays a background object 402 imitating a podium in the center thereof, and a display area 404 for displaying a praise message is provided below the background object 402. The display area 404 is shown by a rectangular frame. Moreover, the player character images 406 are displayed according to ranking so as to ride on the background object 402.

In an example shown in FIG. 14, a praise message for the player of the first place of the overall ranking (here, the player A) such as "Decisive factor to victory is highest winning percentage of mini games" is displayed in the display area 404. The praise message and a determination method of the praise message will be described later.

Figure 15:
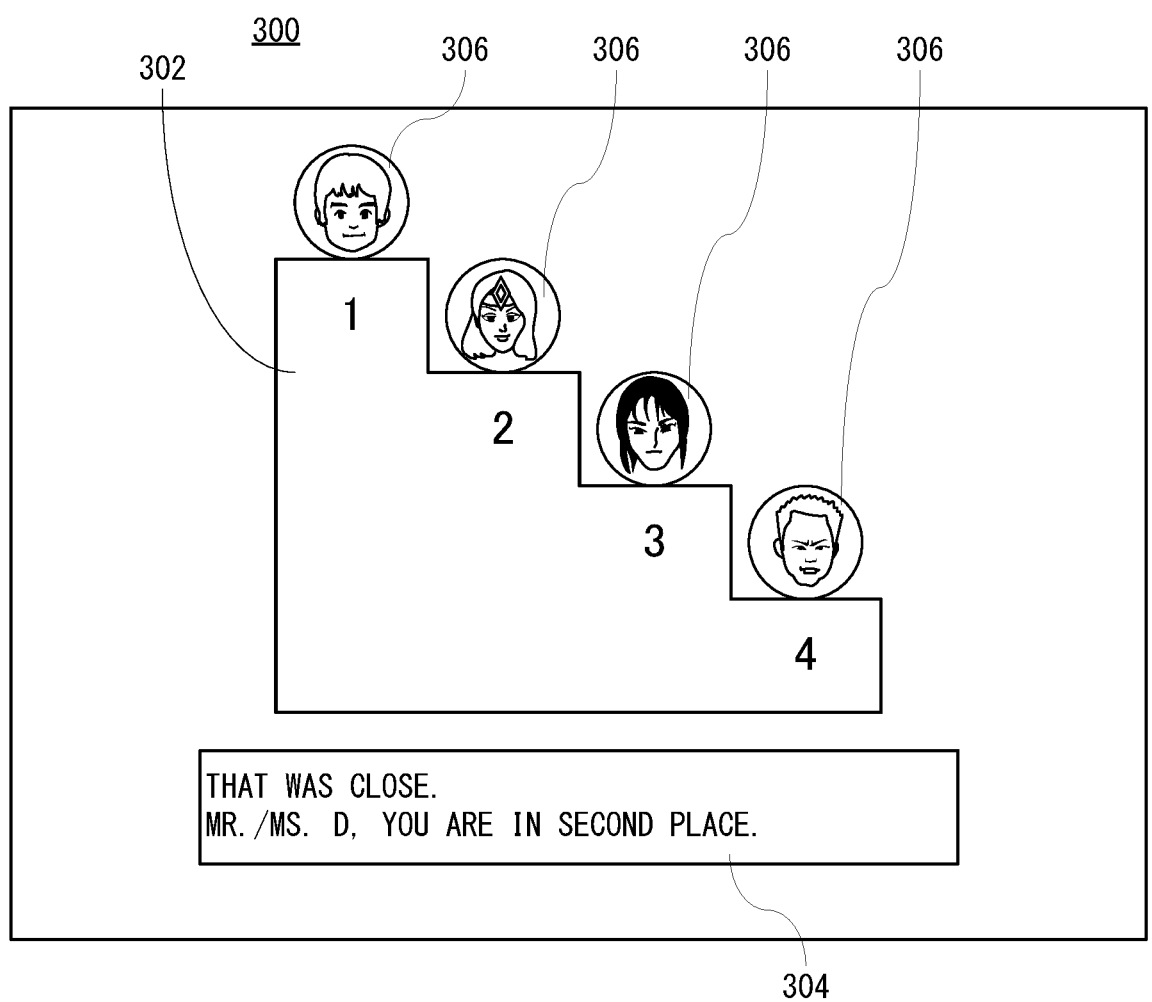
FIG. 15 is a view showing a non-limiting example ranking announcement screen of a second place.

FIG. 15 is a view showing a non-limiting example praise screen 400 of the second place of the overall ranking. If the praise screen 400 of the first place of the overall ranking is displayed for few or several seconds (for example, approximately three to five (3-5) seconds), instead of the praise screen 400 of the first place of the overall ranking, a ranking announcement screen 300 for the second place of the overall ranking is displayed on the display 12. As seen compared with the ranking announcement screen 300 of the first place of the overall ranking shown in FIG. 13, in this embodiment, the ranking announcement screen 300 of the second place of the overall ranking is the same or similar to the ranking announcement screen 300 of the first place of the overall ranking except that the ranking message displayed in the display area 304 is a ranking message for the second place.

Specifically, as shown in FIG. 15, the ranking message for the second place of the overall ranking such as "That was close. Mr./Ms. D, you are in second place" is displayed in the display area 304.

Figure 16:
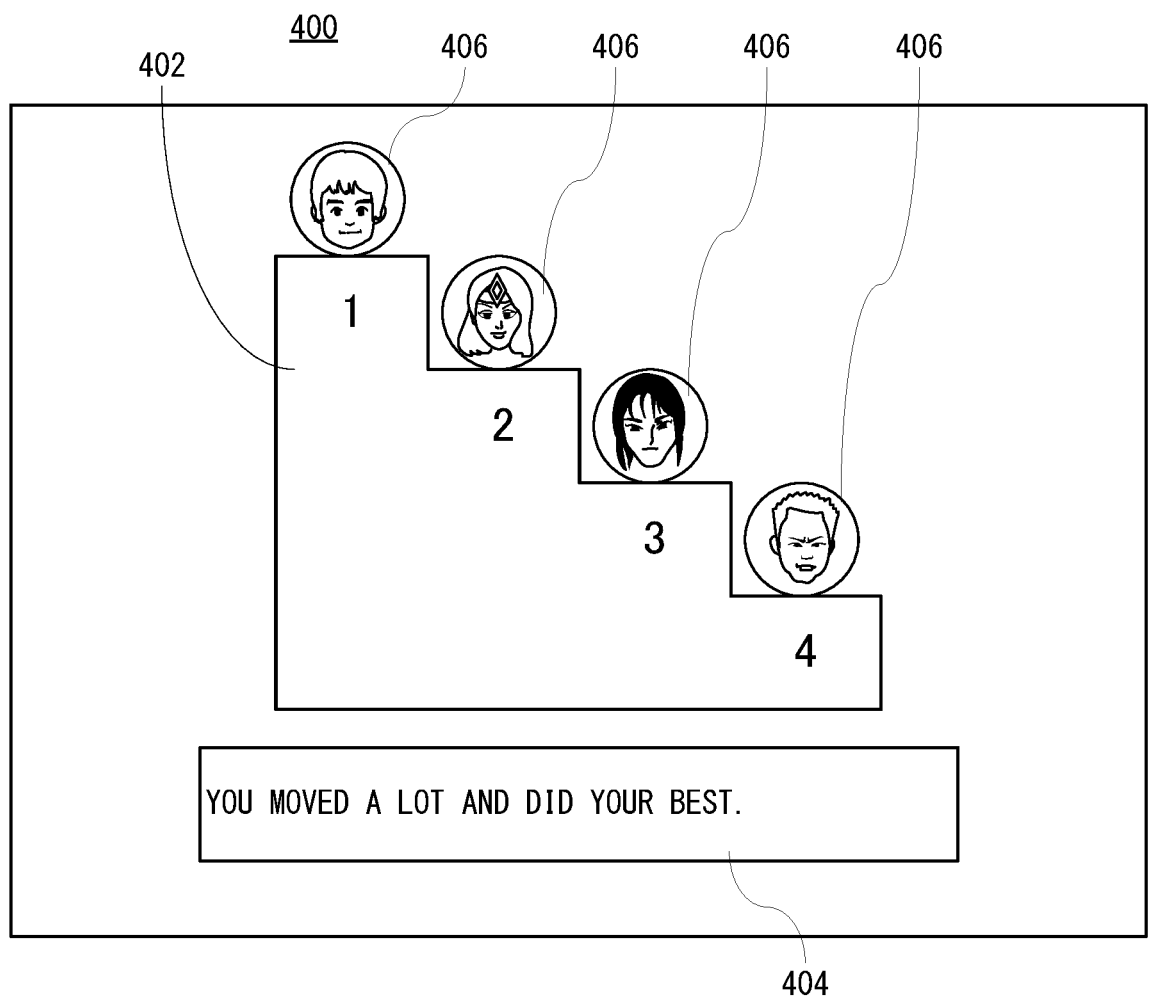
FIG. 16 is a view showing a non-limiting example praise screen to the second place.

FIG. 16 is a view showing a non-limiting example praise screen 400 for the second place of the overall ranking. If the ranking announcement screen 300 of the second place of the overall ranking is displayed for few or several seconds (for example, approximately three to five (3-5) seconds), instead of the praise screen 400 of the second place of the overall ranking, the ranking announcement screen 300 for the second place of the overall ranking is displayed on the display 12. As seen compared with the praise screen 400 of the first place of the overall ranking shown in FIG. 14, in this embodiment, the praise screen 400 of the second place of the overall ranking is the same or similar to the praise screen 400 of the first place of the overall ranking except that the praise message displayed in the display area 404 is a praise message for the second place.

Specifically, as shown in FIG. 16, the praise message for the second place of the overall ranking such as "You moved a lot and did your best" is displayed in the display area 404.

Although illustration is omitted, after displaying the praise screen 400 for the second place of the overall ranking for few or several seconds, a ranking announcement screen 300 of the third place of the overall ranking is displayed for few or several seconds, and subsequently, a praise screen 400 for the third place of the overall ranking is displayed for few or several seconds, and further a ranking announcement screen 300 of the fourth place of the overall ranking is displayed for few or several seconds, and finally, a praise screen 400 for the fourth place of the overall ranking is displayed for few or several seconds. However, when the number of persons who play the virtual game is two (2), the ranking announcement screen 300 and the praise screen 400 for the third place and the fourth place of the overall ranking are not displayed. Moreover, when the number of persons who play the virtual game is three (3), the ranking announcement screen 300 and the praise screen 400 for the fourth place of the overall ranking are not displayed Since the ranking announcement screen 300 and the praise screen 400 are displayed for each place of the overall ranking in this embodiment, a variety is created to the display of the result announcement with a combination of the ranking message and the praise message. However, a single screen that both the ranking message and the praise message are arranged may be displayed without displaying the ranking announcement screen 300 and the praise screen 400 separately.

Moreover, since it is possible to assume that the players are acquaintance or have relationships in the single-machine match, the local match and the friend match, by displaying the ranking announcement screen 300 and the praise screen 400 for each place of the overall ranking, communication with each other can be activated.

FIG. 17 is a view showing a non-limiting example ranking message table. As shown in FIG. 17, two ranking messages are set corresponding to each place of the overall ranking in the ranking message table. However, a player name of the corresponding player is entered in a portion described as "xx" in the ranking message.

In correspondence to the first place of the overall ranking, a ranking message such as "Congratulations, you are in first place Mr./Ms. xx, Great" and a ranking message such as "Mr./Ms. xx, Congratulations on your first place. That's great" are set.

In correspondence to the second place of the overall ranking, a ranking message such as "Mr./Ms. xx, You came in a close second. Let's take the first place next time for sure" and a ranking message such as "That was close. Mr./Ms. xx, You are in second place" are set.

In correspondence to the third place of the overall ranking, a ranking message such as "Mr./Ms. xx, Good job. You are in third place this time" and a ranking message such as "Mr./Ms. xx, Sorry, you are in third place this time. Let's aim for upper place next time" are set.

In correspondence to the fourth place of the overall ranking, a ranking message such as "Mr./Ms. xx, You are in fourth place this time. You did your best till the end" and a ranking message such as "Mr./Ms. xx, You did your best but are in fourth place. Rivals were strong" are set.

Prior to displaying the above-described ranking announcement screen 300, a ranking message is determined or selected using the ranking message table. In this embodiment, a ranking message is randomly determined for each place of the overall ranking. In an example shown in FIG. 17, two ranking messages are set corresponding to each place of the overall ranking, but three or more ranking messages may be set. Moreover, the ranking message of each place of the overall ranking may be made to be determined alternately (in turn) at each time of displaying.

FIG. 18 is a view showing a non-limiting example raise message table to the first place of the overall ranking. As shown in FIG. 18, a praise message is set corresponding to a praise content in the praise message table for the first place of the overall ranking. Moreover, a priority is set to each praise content (and each praise message). The priority is set high for a praise content for what the player consciously did or worked hard in playing the game, and set low for a praise content having a random element. However, as for the praise content having the random element, a higher priority is set for the praise content that makes the player happy to be praised. Furthermore, the priority of the praise content is made higher in an order of importance in the virtual game and/or in an order of ease of understanding for the player as a reason for winning.

In this embodiment, what is set as the praise content is as follows; the number of acquired coins, the winning percentage of mini game, the number of item use times, the movement amount, the number of times stopping at positive square, the number of times stopping at negative square, the number of times stopping at item square, the number of times stopping at unexpected-event square, - - - , and nothing. The praise content is an index for determining a praise message, and is a content related to the virtual game. Specifically, the praise content is a content to be updated according to an event occurred in the main story of the virtual game. In this embodiment, the number of possessed stars is not included in the praise content. The number of possessed stars is an evaluation value for determining the overall ranking, and is for displaying the praise message with praise content that is different from a direct cause of victory. Similarly, since the number of possessed coins is an evaluation value for determining the overall ranking when the number of possessed stars is the same, the number of possessed coins is not included in the praise content.

"Number of acquired coins" is the accumulated number of the coins that the player or the player character acquires in the main story of the virtual game, and unlike the number of the coins that the player or the player character possesses (i.e., the number of possessed coins), the number of coins disappeared or used in the main story of the virtual game is disregarded. "Winning percentage of mini game" is a ratio of the number of times that the player or player character got the first place in the mini game to the number of times that the player or player character played the mini game. "Number of item use times" is the number of times that the player or the player character used the item in the main story of the virtual game. "Movement amount" is a total number of squares that the player character moved in the main story of the virtual game. "Number of times stopping at positive squire" is the number of times that the player character stopped at a positive squire in the main story of the virtual game. "Number of times stopping at negative squire" is the number of times that the player character stopped at a negative squire in the main story of the virtual game.

"Number of times stopping at item squire" is the number of times that the player character stopped at an item squire in the main story of the virtual game. "Number of times stopping at unexpected-event squire" is the number of times that the player character stopped at an unexpected-event squire in the main story of the virtual game. "Nothing" indicates no praise content.

In the praise message table to the first place of the overall ranking shown in FIG. 18, a praise message such as "You acquired a lot of coins, and made great win" is set in correspondence to "number of acquired coins", and "24" is set as the priority.

In correspondence to "winning percentage of mini game", a praise message such as "Decisive factor to victory is highest winning percentage of mini game" is set, and "25" is set as the priority.

In correspondence to "number of item use times", a praise message such as "You used item well and grained victory" is set, and "16" is set as the priority.

In correspondence to "movement amount", a praise message such as "You moved energetically and won championship steadily" is set, and "15" is set as the priority. In correspondence to "number of times stopping at positive square", a praise message such as "You stopped at positive square a lot. Decisive factor to victory is you could acquire coins stably" is set, and "5" is set as the priority.

In correspondence to "number of times stopping at negative square", a praise message such as "It's surprising you won even though stopped at negative square the most" is set, and "4" is set as the priority.

In correspondence to "number of times stopping at item square", a praise message such as "You obtained items a lot and used them well" is set, and "8 (17)" is set as the priority. A numeric character in parentheses in the column of the priority will be described later. This is the same also about the number of times stopping at the unexpected-event square described later.

In correspondence to "number of times stopping at unexpected-event square", a praise message such as "A lot of unexpected-events occurred, but you won that was lucky" is set, and "10 (18)" is set as the priority.

In correspondence to "nothing", a praise message such as "Decisive factor to victory is balanced match" and a praise message such as "It's stable play. No wonder you won" are set, and "1" is set as the priority, respectively. However, since there is no praise content, a praise message is a general-purpose message that does not refer to a content that is to be updated in response to an event occurring in the virtual game.

The praise message for the first place of the overall ranking basically determines the praise content that the index ranking is the first place as a notable praise content, and thus, is determined to the notable praise message indicated corresponding to the praise content (equivalent to "notable index"). Here, the index ranking means a ranking on each praise content when comparing with other players. For example, when the praise content is "number of times stopping at positive square", the number of times stopping at the positive square of a target player to determine a praise message and the number of times stopping at the positive square of a further player are compared with each other, and the index ranking is determined so that the larger number of times stopping at the positive square, the higher the place of the ranking. When determining a praise message for the first place of the overall ranking, a target player to determine the praise message is the player of the first place of the overall ranking, and the further player is each of the players of the second to fourth places of the overall ranking.

In addition, the number of times stopping at the positive square of each player is obtainable from the player data 854*e* (see FIG. 22) described later. The same is true when determining the index ranking for other praise contents.

However, when there are a plurality of praise contents that the index ranking is the first place, the praise content with the higher priority is determined as the notable praise content, and the praise message corresponding to the notable praise content is determined. However, as for the praise content that the index ranking is the first place alone because there no player having the same score, the priority is set to be high. For example, a third predetermined number (for example, thirty (30)) is added to the priority set in the praise message for the first place of the overall ranking. Otherwise, as for the praise content that is the same score as the further player and thus the index ranking is the first place, the priority may be set low. For example, the priority that is set in the praise message table to the first place of the overall ranking is changed into "1". In any cases, it is possible to make the praise message corresponding to the praise content of the first place with the same score difficult to be selected. Therefore, it is possible to make the praise message corresponding to the praise content that is peculiar to the player easy to be determined as the praise message for the first place of the overall ranking.

Moreover, in another example, as the praise message for the first place of the overall ranking, the praise message indicated corresponding to the praise content that the index ranking is higher place (i.e., the first place or the second place) may be determined. However, when there are a plurality of praise contents that the index ranking is higher place, as the praise message for the first place of the overall ranking, the praise message having higher priority is determined.

Moreover, in a further example, by determining the praise content with the lowest index ranking as the notable praise content, the praise message can be determined. For example, when the number of times stopping at the negative square is the lowest place, "the number of times stopping at negative square" is determined as a notable praise content, and a praise message is determined. However, when determining a praise content that the index ranking is the lowest place as a notable praise content, a content of the praise message is changed. For example, in correspondence to "the number of times stopping at negative square", a praise message may be set as "Decisive factor to victory is the number of times stopping at negative square least".

Moreover, in another example, when there are the praise contents that the index ranking is the first place or upper place in plural number, a plurality of praise messages corresponding to the plurality of praise contents may be displayed in the display area 404 of the praise screen 400.

In this embodiment, when there is no praise content that the index ranking is the first place (or upper place) compared with other players, "nothing" is determined as a notable praise content, and a praise message that is indicated corresponding to the praise content "nothing" is determined. In this embodiment, since two praise messages are set corresponding to "nothing", one praise message is randomly determined from the two praise messages. However, three or more praise messages may be set. In this embodiment, since a praise message is displayed even when there is no praise content, it is possible to diversify a display of result announcement.

Moreover, two or more praise messages may be set for the praise content other than "nothing", and one praise message may be randomly determined from the two or more praise messages.

Moreover, the numeric character in parentheses written below the numeric character of the priority in the praise message table for the first place of the overall ranking is a priority to be used when satisfying a predetermined condition. The predetermined condition is a value for the praise content. In this case, when the number of times stopping at item square is less than ten (10), the priority is "8", but the priority is "17" when the number is ten (10) or more.

Moreover, in another example, a predetermined condition may be values for the number of turns and the praise content. In this case, in a case where the number of turns is less than ten (10), if the number of times stopping at item square is less than five (5), the priority is "8" but if the number of times stopping at item square is more than five (5), the priority is "17". Moreover, in a case where the number of turns is more than ten (10), if the number of times stopping at item square is less than ten (10), the priority is "8" but if the number of times stopping at item square is more than ten (10), the priority is "17".

Although a description is omitted, as for also the priority corresponding to the number of times stopping unexpected-event square, the priority may be changed similarly.

Moreover, when satisfying the predetermined condition in this embodiment, the priority is made high, but the priority may be made low.

FIG. 19 is a view showing a non-limiting example praise message table except the first place of the overall ranking. As shown in FIG. 19, also in the praise message table except the first place of the overall ranking, a praise message is set corresponding to a praise content. Moreover, a priority is set to each praise content (and each praise message).

Each praise content and set priority are the same or similar to those in the praise message table for the first place of the overall ranking, but content of message differs. Therefore, even if a notable praise content is the same, the praise messages having different contents are associated to a case of the first place of the overall ranking and a case of places other than the first place, respectively. In the following, the praise message table except the first place of the overall ranking will be described, but a description for the contents the same or similar to those of the praise message table for the first place of the overall ranking will be omitted.

Moreover, since a determination method of the praise message other than the first place of the overall ranking is the same or similar to the determination method of the praise message for the first place of the overall ranking, a duplicate description will be omitted. However, in order to avoid duplicating praise content of the praise message for each player, when determining a praise message for places of the overall ranking other than the first place, the praise content corresponding to the praise message having already determined as the praise message for other places of the overall ranking is excluded from a notable praise content.

In addition, when determining a praise message for the second place of the overall ranking, a player to be determined with the praise message is a player of the second place of the overall ranking and other players are the players of the first place, the third place and the fourth place of the overall ranking. Moreover, when determining a praise message for the third place of the overall ranking, a player to be determined with the praise message is a player of the third place of the overall ranking and other players are the players of the first place, the second place and the fourth place of the overall ranking. Furthermore, when determining a praise message for the fourth place of the overall ranking, a player to be determined with the praise message is a player of the fourth place of the overall ranking and other players are the players of the first place, the second place and the third place of the overall ranking.

In the praise message table except the first place of the overall ranking shown in FIG. 19, in correspondence to "number of acquired coins", the praise message such as "It seems you acquired more coins that anyone else. Very impressive" is set.

In correspondence to "winning percentage of mini game", the praise message such as "It seems your winning percentage of mini game was highest. Very impressive" is set.

In correspondence to "number of item use times", the praise message such as "You used item a lot. Great" is set.

In correspondence to "movement amount", the praise message such as "You moved a lot and did your best" is set.

In correspondence to "number of times stopping at positive square", the praise message such as "You stopped at positive square more times than anyone else. It seems you acquired coins stably" is set.

In correspondence to "number of times stopping at negative square", the praise message such as "It seems you stopped at negative square more times than anyone else. You did your best without any setbacks" is set.

In correspondence to "number of times stopping at item square", the praise message such as "It seems you obtained items more times than anyone else" is set.

In correspondence to "number of times stopping at unexpected-event square", the praise message such as "You enjoyed while occurring a lot of unexpected-events" is set.

In correspondence to "nothing", the praise message such as "It's good match. Very nice" and a praise message such as "It's stable match. Very nice" are set. However, in the praise message table except the first place of the overall ranking, "nothing" includes not only a case indicating that there is no praise content corresponding to the first place of the overall ranking but also a case indicating that there is a praise content corresponding to the first place of the overall ranking, but the praise content is the praise content corresponding to the praise message having been announced for another place of the overall ranking and thus excluded from a notable praise content.

Moreover, as described above, three or more praise messages may be set. For example, since when determining the praise message other than the first place of the overall ranking, that is, determining the praise messages for the second place, the third place and the fourth place of the overall ranking, there is an occasion that "nothing" is determined as a notable praise content for each of them, if three praise messages are set corresponding to "nothing", it is possible to display the praise messages for the second place, the third place and the fourth place of the overall ranking, respectively without duplication even in such an occasion.

In this embodiment, since the praise message table for the first place of the overall ranking and the praise message table except the first place of the overall ranking, in each of which a plurality of praise messages are set, are provided, the display content of the praise screen 400, that is, the display of the result announcement can be diversified. Moreover, it is possible to display the praise messages corresponding to each group the first place of the overall ranking and other than the first place. However, praise message tables for a group of upper places (i.e., first place and second place) of the overall ranking and for a group of lower places (i.e., third place and fourth place) of the overall ranking may be prepared, and praise message tables for each group of each place (i.e., first place, second place, third place and fourth place of the overall ranking) may be prepared.

That is, a plurality of players participating in the virtual game of the random match are classified into respective groups according to respective places, and the praise message is determined using the praise message tables prepared to the classified groups.

Moreover, since the praise message table for the first place of the overall ranking and the praise message table except the first place of the overall ranking are provided, it is possible to present the praise message according to getting the first place of the overall ranking (or winning victory), and it is possible to reduce an amount of praise messages to be prepared for the player not the first place of the overall ranking (or not winning victory). Moreover, since the players of the second place or lower place of the overall ranking are common in a fact that they did not win the victory, even if the praise message is commonly used for such players, it does not almost have feeling uncomfortable.

Figure 20:
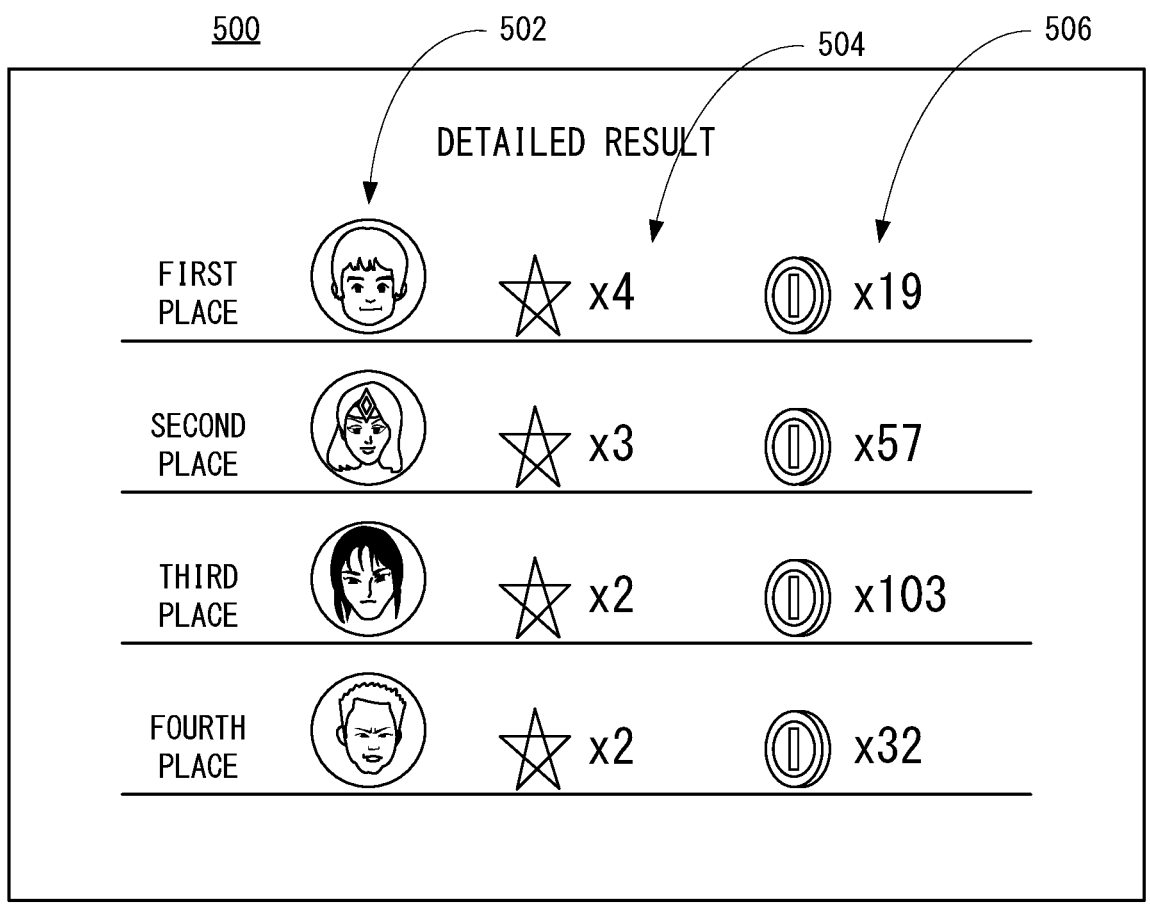
FIG. 20 is a view showing a non-limiting example detailed result confirmation screen.

If ending the displaying the ranking announcement screen 300 and the praise screen 400, a final result is announced. FIG. 20 is a view showing a non-limiting example detailed result confirmation screen 500 displayed on the display 12 of the main body apparatus 2.

As shown in FIG. 20, in the detailed result confirmation screen 500, player character images 502 are displayed corresponding to respective places of the overall ranking, and corresponding to each player character image 502, an image 504 of the number of possessed stars of each player character (or each player) and an image 506 of the number of possessed coins of each player character (or each player) are displayed. That is, a final ranking of the player character (or player) for the virtual game and an evaluation value used for determining the final ranking are presented. As described above, the ranking is determined according to the number of possessed stars, and if the number of possessed stars is the same, the ranking of the player with the larger number of possessed coins is determined to be higher.

If a predetermined button is operated when the detailed result confirmation screen 500 is being displayed, the detailed result confirmation screen 500 is undisplayed, and result announcement processing is ended. However, also when a time period that the predetermined button is not operated elapses a fourth predetermined time period (for example, about ten (10) to thirty (30) seconds), the detailed result confirmation screen 500 is undisplayed, and result announcement processing is ended.

Figure 21:
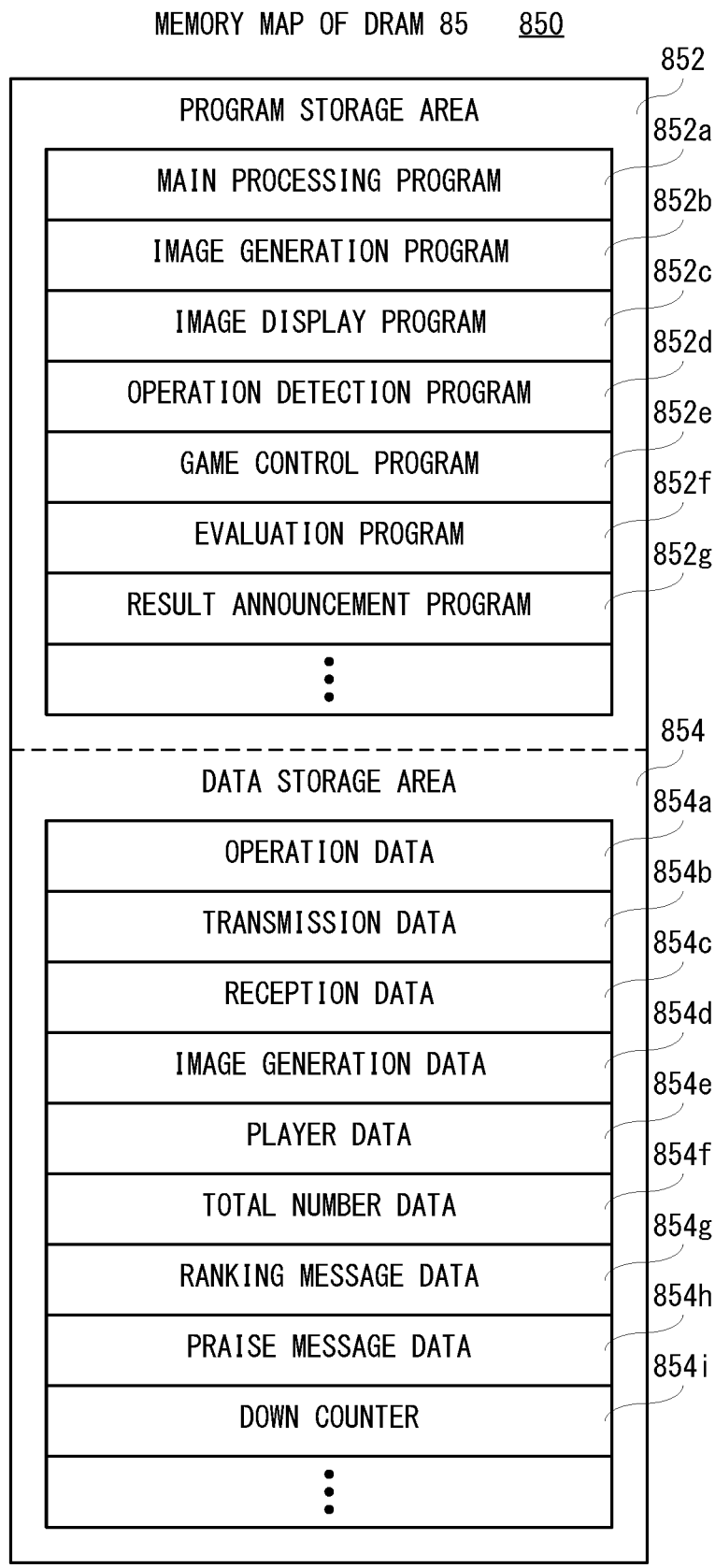
FIG. 21 is a view showing a non-limiting example memory map of a DRAM of the main body apparatus shown in FIG. 6.

FIG. 21 is a view showing a non-limiting example memory map 850 of the DRAM 85 shown in FIG. 6. As shown in FIG. 21, the DRAM 85 includes a program storage area 852 and a data storage area 854. The program storage area 852 is stored with a program of a game application (i.e., game program). As shown in FIG. 21, the game program includes a main processing program 852a, an image generation program 852b, an image display program 852c, an operation detection program 852d, a game control program 852e, an evaluation program 852f, a result announcement program 852g, etc. However, a function of displaying images such as a game image is a function that the main body apparatus 2 is provided with. Therefore, the image display program 852c is not included in the game program.

Although detailed description is omitted, at a proper timing after a power of the main body apparatus 2 is turned on, a part or all of each of the programs 852a-852g is read from the flash memory 84 and/or a storage medium attached to the slot 23 to be stored in the DRAM 85. However, a part or all of each of the programs 852a-852g may be obtained from other computers capable of performing communication with the main body apparatus 2.

The main processing program 852a is a program for executing overall game processing (hereinafter, referred to as "overall processing") of a virtual game of this embodiment. The image generation program 852b is a program for generating, using image generation data 854b described later, display image data corresponding to various kinds of images such as a game image. The image display program 852c is a program for outputting to a display device the display image data generated according to the image generation program 852b. Therefore, images corresponding to the display image data (i.e., evaluation screen 200, ranking announcement screen 300, praise screen 400, etc.) are displayed on the display device such as the display 12.

The operation detection program 852d is a program for obtaining the operation data 854a from the left controller 3 and/or the right controller 4. The game control program 852e is a program for performing game control processing of the virtual game according to operations of the player and the opponent player (a computer player may be included).

The evaluation program of 852f is a program for performing the evaluation on the main story of the virtual game when the game control processing for the virtual game of the random match is ended. The result announcement program 852g is a program for announcing the ranking messages and the praise messages to all the players of the virtual game except the random match and displaying the detailed result confirmation screen 500, or for announcing the ranking message and the praise message for the player of the virtual game of the random match and displaying the detailed result confirmation screen 500.

In addition, the program storage area 852 is further stored with a sound output program for outputting a sound such as a BGM, a communication program for performing communication with other apparatuses, a backup program for storing data in a nonvolatile storage medium such as the flash memory 84, etc.

Moreover, the data storage area 854 is stored with the operation data 854a, transmission data 854b, reception data 854c, the image generation data 854d, player data 854e, total number data 854f, ranking message data 854g, praise message data 854h, etc. Moreover, a down counter 854i is provided in the data storage area 854.

The operation data 854a is operation data received from the left controller 3 and/or the right controller 4. In this embodiment, when the main body apparatus 2 receives the operation data from both of the left controller 3 and the right controller 4, the main body apparatus 2 stores the operation data 854a with classifying into the left controller 3 and the right controller 4. Moreover, when one or more other controllers are used, the main body apparatus 2 stores the operation data 854a with the one or more other controllers identifiably.

The transmission data 854b is data to be transmitted to the main body apparatus 2 used by the opponent player in a case of playing the communication game, or to be transmitted to an external apparatus such as the matching server. As an example, the operation data 854a at the time of playing the communication game is transmitted to the main body apparatus 2 that the opponent player uses. Performing of the friend match or the random match, and specifically, instruction data for directing matching of the opponent player is transmitted to the matching server.

The reception data 854c is data received from the main body apparatus 2 that the opponent player uses in playing the communication game, or from an external apparatus such as the matching server. As an example, operation data of the opponent player is received from the main body apparatus 2 of the opponent player. Information for making communication connection with the opponent player that is matched by the matching server and the main body apparatus 2 that the opponent player uses are received from the matching server.

The image generation data 854d is data required for generating the display image data, such as polygon data and texture data. The player data 854e is data for each player in a case of playing the communication game. Details of the player data 854e will be described later (see FIG. 22).

The total number data 854f is data for the total number of applause obtained when the evaluation processing is performed. The ranking message data 854g is data of the ranking message table shown in FIG. 17. The praise message data 854h is data of the praise massage table for the first place shown in FIG. 18 and data of the praise message table except the first place shown in FIG. 19.

The down counter 854i is a counter (or timer) for counting the first predetermined time period that the evaluation input (i.e., applauding) can be performed the in the evaluation processing.

Although illustration is omitted, the data storage area 854 is stored with other data, and is provided with other flags and timer(s) (counter(s)).

Figure 22:
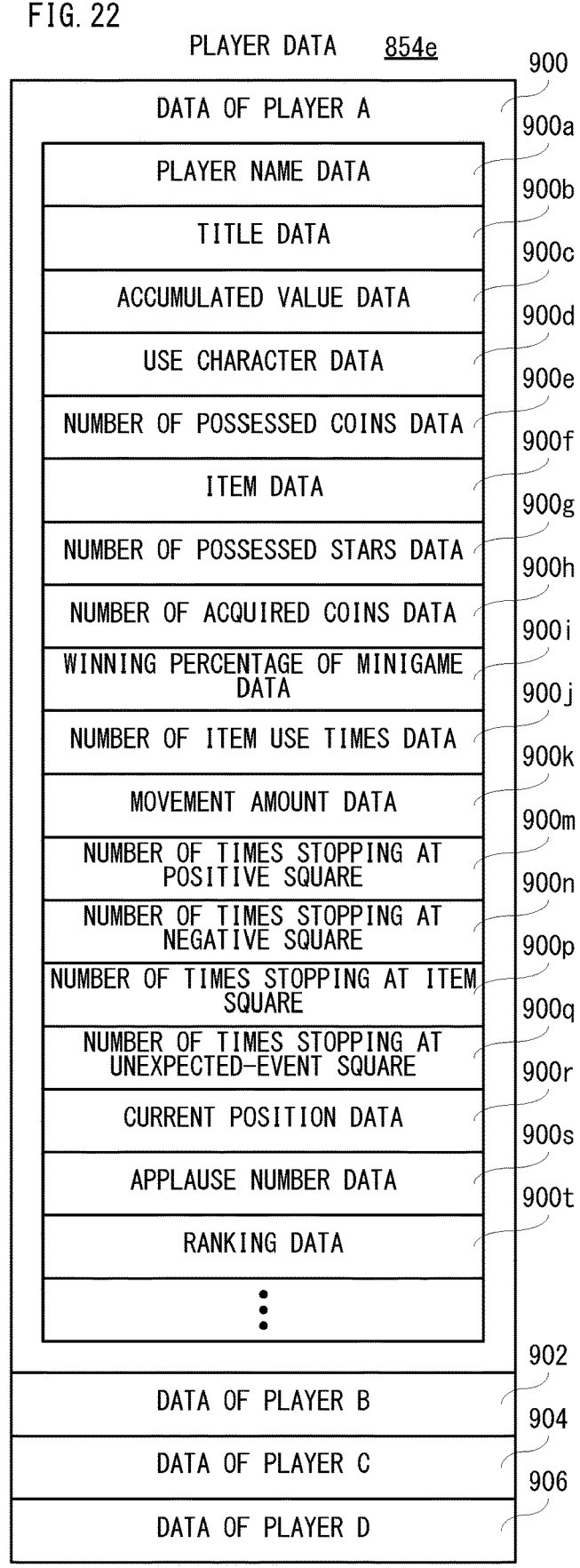
FIG. 22 is a view showing a non-limiting example specific contents of player data shown in FIG. 21.

FIG. 22 is a view showing non-limiting example specific contents of the player data 854e shown in FIG. 21. Player data 854e includes player A data 900, player B data 902, player C data 904 and player D data 906. An example shown in FIG. 22 shows the player data 854e in a case of playing the communication game with four (4) players (the computer player may be included). Since specific contents of the player A data 900, the player B data 902, the player C data 904 and the player D data 906 are the same, the player A data 900 will be described, and descriptions of the player B data 902, the player C data 904 and the player D data 906 will be omitted.

The player A data 900 includes player name data 900a, title data 900b, accumulated value data 900c, use character data 900d, number of possessed coins data 900e, item data 900f, number of possessed stars data 900g, number of acquired coins data 900h, winning percentage of mini game data 900i, number of item use times data 900j, movement amount data 900k, number of times stopping at positive square data 900m, number of times stopping at negative square data 900n, number of times stopping at item square data 900p, number of times stopping at unexpected-event square data 900q, current position data 900r, applause number data 900s, ranking data 900t, etc.

The player name data 900a is data indicating a name (here, "A") of the player A corresponding to the player A data 900. The title data 900b is data indicating a title that the player A selects. The accumulated value data 900c is data of a value of the accumulated value that accumulates total number of applause by all the players who perform the evaluation in each past random match of the player A corresponding to the player A data 900.

The use character data 900d is data for identifying a player character (hereinafter, referred to as "player character of the player A" when descripting FIG. 22) that the player A uses in a virtual game. The number of possessed coins data 900e is data of the number of coins that the player A or the player character of the player A possesses. The item data 900f is data for identifying the item that the player A or the player character of the player A possesses, and is data of the number of each item.

The number of possessed stars data 900g is data of the number of stars that the player A or the player character of the player A possesses. The number of acquired coins data 900h is data of the accumulated number of coins that the player A or the player character of the player A acquires in the main story of the virtual game. As described above, the number of acquired coins is a value that ignores the number of coins having been used or lost as different from the number of possessed coins.

The winning percentage of mini game data 900i is data of a numerical value indicating the winning percentage of the mini game that the player A or the player character of the player A plays in the virtual game. As described above, the winning percentage of mini game is a ratio of the number of times getting the first place in the mini game to the number of times playing the mini game. The number of item use times data 900j is data of the number of times that the player A or the player character of the player A uses the item in the main story of the virtual game. The movement amount data 900k is data of a total number of squares that the player character of the player A moves in the main story of the virtual game.

The number of times stopping at positive square data 900m is data of the number of times that the player character of the player A stops at the positive square in the main story of the virtual game. The number of times stopping at negative square data 900n is data of the number of times that the player character of the player A stops at the negative square in the main story of the virtual game. The number of times stopping at item square data 900p is data of the number of times that the player character of the player A stops at the item square in the main story of the virtual game. The number of times stopping at unexpected-event square data 900q is data of the number of times that the player character of the player A stops at the unexpected-event square in the main story of the virtual game.

The current position data 900r is coordinate data of a current position of the player character of the player A in a virtual space. The applause number data 900s is data of the number that the player A applauded in the evaluation processing (i.e., number of times of operations of the A button 53). The ranking data 900t is data of a place of the overall ranking of the player character of the player A in the virtual game.

The above-described number of possessed coins data 900e, item data 900f, number of possessed stars data 900g, number of acquired coins data 900h, winning percentage of mini game data 900i, number of item use times data 900j, movement amount data 900k, number of times stopping at positive square data 900m, number of times stopping at negative square data 900n, number of times stopping at item square data 900p, number of times stopping at unexpected-event square data 900q and current position data 900r are suitably updated according to an event occurs in the main story of the virtual game.

Although illustration is omitted, other data such as data of the number of possessed in-game currencies that the player A possesses, etc. are included in the player A data 900.

FIG. 23-FIG. 26 are flowcharts showing non-limiting example processing (overall processing) of the game program of the processor 81 (or computer) of the main body apparatus 2. In the following, although the overall processing and various kinds of processing included therein will be described using FIG. 23-FIG. 28, a duplicated description on steps that the same processing is performed will be omitted. Moreover, when performing the communication game, in also the main body apparatus 2 of the opponent player, the same processing as the overall processing shown in FIG. 23-FIG. 26 is performed.

However, processing of respective steps of the flowcharts shown in FIG. 23-FIG. 28 are mere examples, and if the same or similar result is obtainable, an order of the respective steps may be exchanged. Moreover, in this embodiment, it will be described that the processor 81 executes the processing of the respective steps of the flowcharts shown in FIG. 23-FIG. 28 basically; however, some steps may be executed by a processor(s) and/or a dedicated circuit(s) other than the processor 81.

When the power of the main body apparatus 2 is turned on, prior to execution of the overall processing, the processor 81 executes a boot program stored in a boot ROM not shown, whereby respective units including the DRAM 85, etc. are initialized. The main body apparatus 2 starts the overall processing if execution of the game program of this embodiment is instructed by the player.

Figure 23:
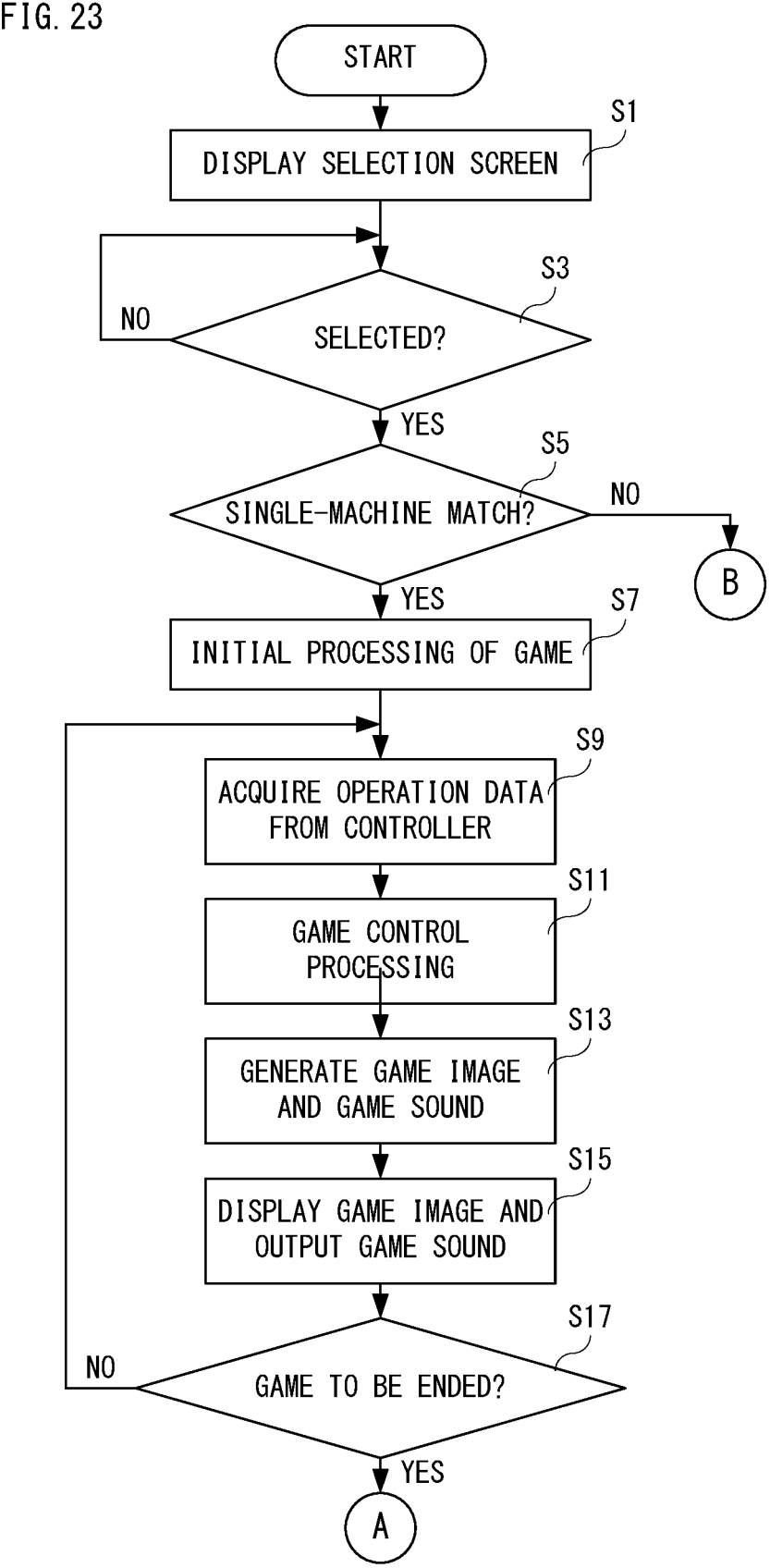
FIG. 23 is a flowchart showing a first part of non-limiting example overall processing of a processor of the main body apparatus shown in FIG. 6.
Figure 24:
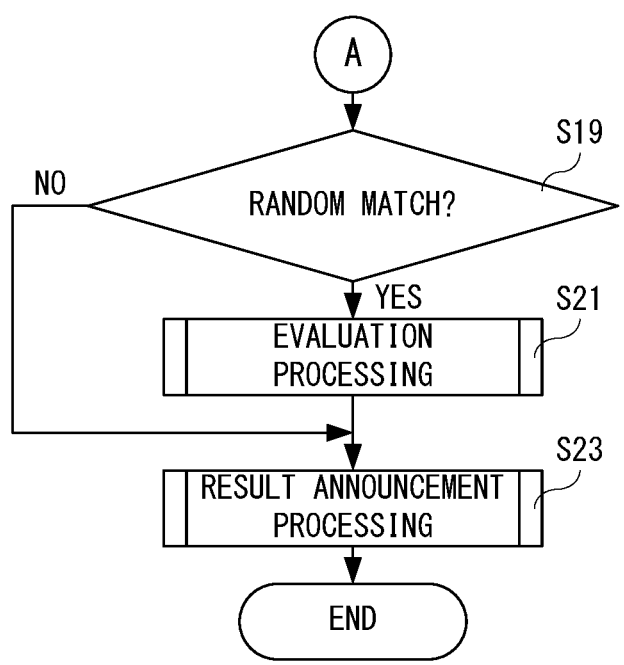
FIG. 24 is a flowchart showing a second part of the non-limiting example overall processing of the processor of the main body apparatus shown in FIG. 6, following FIG. 23.

As shown in FIG. 23, if stating the overall processing, the processor 81 displays a selection screen on the display 12 in a step S1. As described above, the selection screen is a game image for selecting the number of playing persons and a method of match.

In a next step S3, it is determined whether there is any selection. If "NO" is determined in the step S3, that is, if the number playing persons and/or a method of match is not selected, the process returns to the step S3. On the other hand, if "YES" is determined in the step S3, that is, if the number of playing persons and the method of match are selected, it is determined, in a step S5, whether the single-machine match is selected.

Figure 25:
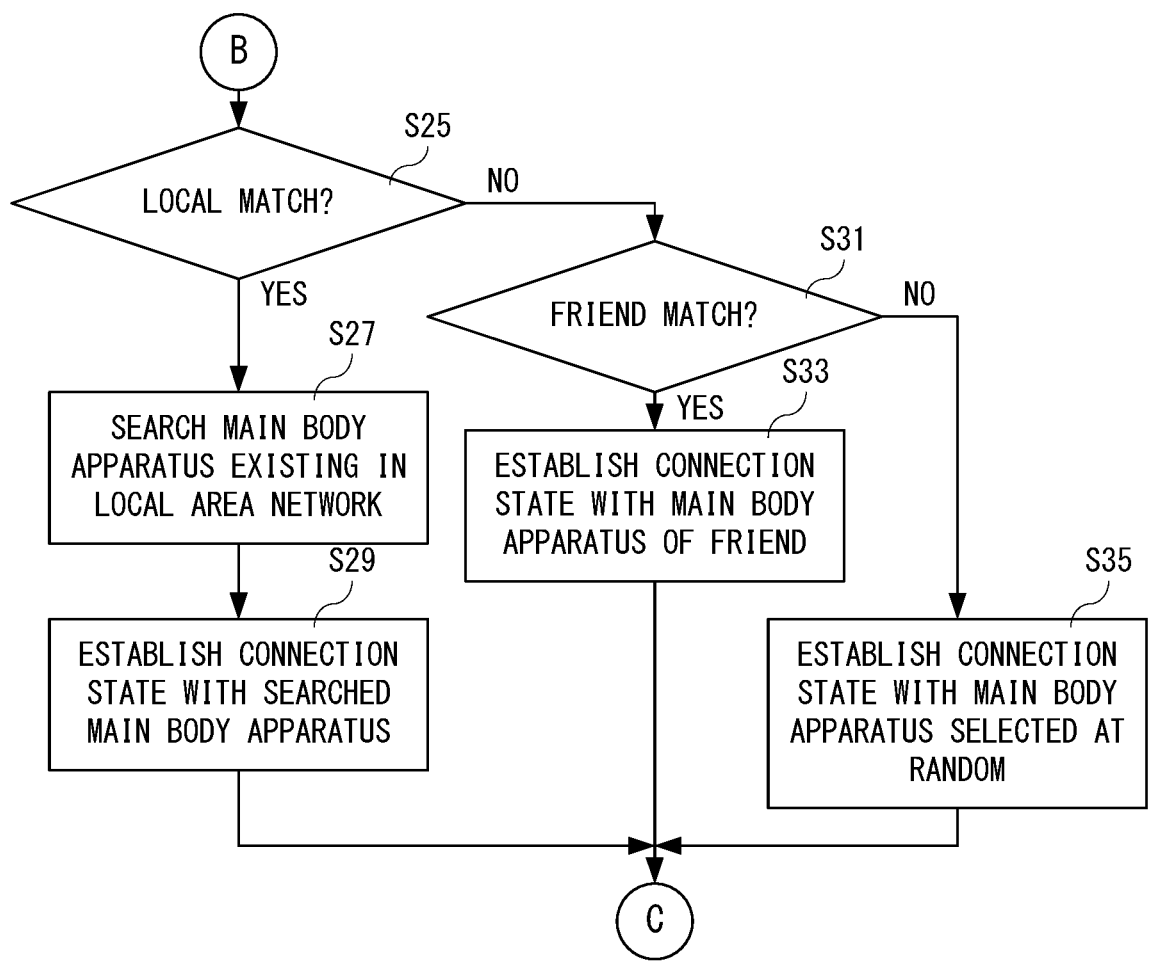
FIG. 25 is a flowchart showing a third part of the non-limiting example overall processing of the processor of the main body apparatus shown in FIG. 6, following FIG. 23.

If "NO" is determined in the step S5, that is, if the single-machine match is not selected as the method of match, the process proceeds to a step S25 shown in FIG. 25. On the other hand, if "YES" is determined in the step S5, that is, if the single-machine match is selected as the method of match, initial processing of a virtual game of the single-machine match is performed in a step S7. Here, the processor 81 displays a selection screen of the controller that the player uses, and the controller selected by each player is registered as the controller that each player uses. When ending the selection of the controller, the processor 81 displays a selection screen of a player character, and the player character selected by each player is registered as the player character that each player uses. After ending the selection of the player, the processor 81 displays a selection screen of game stage to play, and a game stage selected by the player is determined as a game stage to play. If the game stage is determined, the processor 81 displays a turn number selection screen to play, and determines the turn number selected by the player as the turn number to play. If ending the selection of the turn number, the processor 81 arranges a plurality of player characters, one or more non-player characters, a plurality of background objects and a virtual camera at respective initial positions in the virtual space. At this time, coordinate data of the initial position of a plurality of each of player characters is stored in the player data 854*e* of the data storage area 854 as each current position data (900*k*). Moreover, the processor 81 outputs the game image imaged with the virtual camera in the virtual space to the display 12. Therefore, a game image when starting the virtual game is displayed on the display 12 use.

In a subsequent step S9, the operation data is obtained from the controller. Here, the processor 81 obtains the operation data from the controller that the player in turn to play uses (one controller out of the controllers 3 and 4 and one or more further controllers) or the operation data from the controllers that a plurality of players who play the mini game (the controllers 3 and 4 and one or more further controllers).

In a next step S11, the processor 81 performs the game control processing. Here, if the player character is arranged on the movement route, according to the operation of the player, rolls a die, moves the player character along the squares, or perform an event set on the square the player character stops. Moreover, if the mini game is being played, according to the operation of each player, operates (including movement) the player character that each player uses. Moreover, in the game control processing, the processor 81 determines a final ranking of the virtual game according to the above-described method, or determines the victory or defeat or ranking in the mini game.

Subsequently, in a step S13, the game image and the game sound are generated. Here, based on a result of the game control processing in the step S5, the processor 81 generates game image data corresponding to the game image and generates sound data corresponding to the game sound.

In a next step S15, the game image is displayed and the game sound is output. Here, the processor 81 outputs the game image data generated in the step S13 to the display 12 and outputs the game sound data generated in the step S13 to the speaker 88 through the codec circuit 87.

Then, it is determined, in a step S17, whether the game is to be ended. Here, the processor 81 determines whether the game control processing of the predetermined number of turns is performed. If "NO" is determined in the step S17, that is, if the game is not to be ended, the process returns to the step S9. On the other hand, if "YES" is determined in the step S17, that is, if the game is to be ended, it is determined, in a step S19 shown in FIG. 24, whether a virtual game of the random match has been played.

If "NO" is determined in the step S19, that is, if a virtual game of the single-machine match, the local match or the friend match has been played, the process proceeds to a step S23. On the other hand, if "YES" is determined in the step S19, that is, if the virtual game of the random match has been played, the evaluation processing (see FIG. 27) described later is performed in a step S21, and then, the process proceeds to the step S23. However, when the player stops playing the virtual game of the random match midway, since subsequent processing is not performed, the processing of the step S21 is also not performed. In the step S23, the result announcement processing (see FIG. 26) described later is performed, and then, the overall processing is terminated.

As shown in FIG. 25, in the step S25, it is determined whether the local match is selected as the method of match. If "YES" is determined in the step S25, that is, if the local match is selected as the method match, the main body apparatus 2 in the LAN is searched in a step S27, and a connection state with the main body apparatuses 2 having been searched is established in a step S29, and then, the process proceeds to a step S37 shown in FIG. 26.

Moreover, if "NO" is determined in the step S25, that is, if the local match is not selected as the method of match, it is determined, in a step 31, whether the friend match is selected as the method of match. If "YES" is determined in the step S31, that is, if the friend match is selected as the method match, a connection state with the main body apparatus 2 that a friend uses is established in a step S33, and then, the process proceeds to the step S37. As described above, in this step S33, the processor 81 requests the matching server for the friend match, and based on the information of the opponent player received in response to the request, a connection state with the main body apparatus 2 of the friend player is established.

Moreover, if "NO" is determined in the step S31, that is, if the random match is selected as the method of match, a connection state with the main body apparatuses 2 that the opponent player selected randomly is established in a step S35, and then, the process proceeds to the step S37. As described above, in this step S35, the processor 81 requests the matching server for the random match, and based on the information of the opponent player received in response to the request, a connection state with the main body apparatus 2 of the opponent player.

Figure 26:
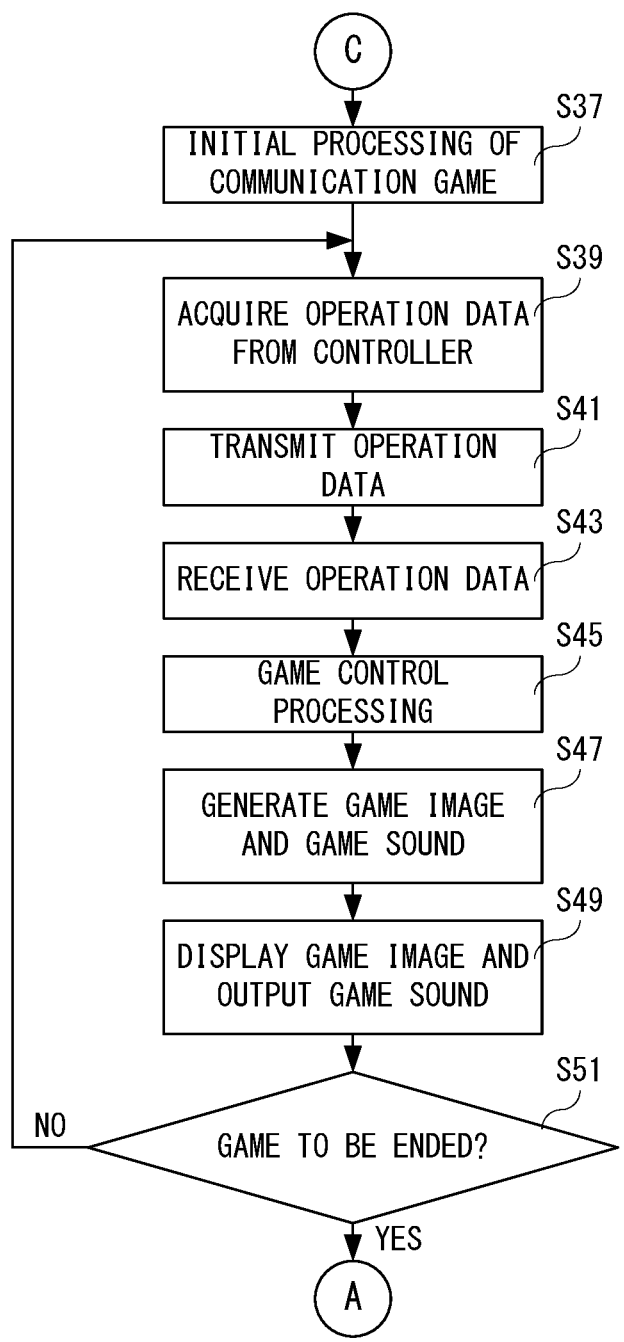
FIG. 26 is a flowchart showing a fourth part of the non-limiting example overall processing of the processor of the main body apparatus shown in FIG. 6, following FIG. 25.

As shown in FIG. 26, in the step S37, initial processing of the communication game is performed. Although the initial processing of the communication game is almost the same as the initial processing described in the step S7, the processor 81 transmits the player data of the player stored in the main body apparatus 2 to the main body apparatus 2 of the opponent player, and receives the player data of the opponent player from the main body apparatus 2 of the opponent player.

In a next step S39, the operation data from the controller is obtained. However, in a turn of the opponent player, there is an occasion that the operation data is not obtained from the controller. In a subsequent step S41, a copy of the operation data detected in the step S39 to the main body apparatus 2 of the opponent player. However, the processor 81 skips processing of the step S41 if the operation data is not obtained in the step S39. Furthermore, in a step S43, the operation data is received from the main body apparatus 2 of the opponent player. However, in a turn of the player, there is an occasion that the operation data is not received, and in that occasion, the processing of the step S43 is skipped.

The game control processing is performed in a step S45, and game image data and sound data are generated in a step S47, and a game image is displayed and a game sound is output in a step S49. In a next step S51, it is determined whether the game is to be ended. If "NO" is determined in the step S51, the process returns to the step S39. On the other hand, if "YES" is determined in the step S51, the process proceeds to the step S19 shown in FIG. 24.

Figure 27:
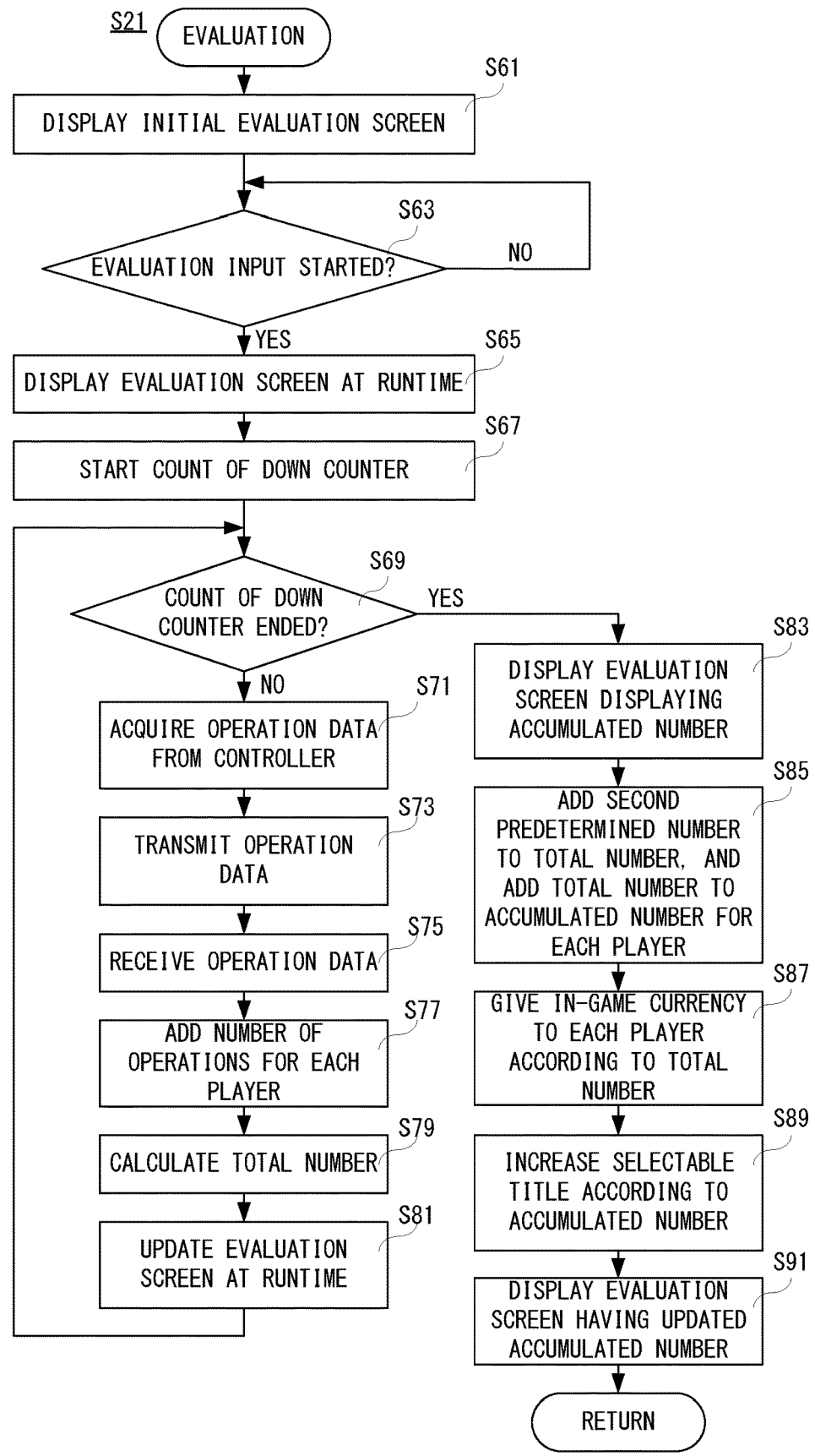
FIG. 27 is a flowchart showing non-limiting example evaluation processing of the processor of the main body apparatus shown in FIG. 6.

FIG. 27 is a flowchart showing non-limiting example evaluation processing in the step S21. As shown in FIG. 27, when starting the evaluation processing, the processor 81 displays the evaluation screen 200 at the time of start of the evaluation processing as shown in FIG. 8 on the display 12. In a subsequent step S63, it is determined whether an evaluation input is to be started. Specifically, in the step S63, the processor 81 determines whether few or several seconds elapses after displaying the evaluation screen 200 at the time of start.

If "NO" is determined in the step S63, that is, if the evaluation input is not to be started, the process returns to the step S63. On the other hand, if "YES" is determined in the step S63, that is, if the evaluation input is to be started, in a step S65, the evaluation screen 200 at the runtime is displayed, and counting of the down counter 854i is started in a step S67. That is, counting of the first predetermined time period, i.e., the time limit is started. In the step S65, the evaluation screen 200 as shown in FIG. 9, that is, the evaluation screen 200 that the both-hands image (216 and 218) corresponding to each player is not displayed so as to applaud and the total number displayed in the image 220 is 0 (zero) is displayed on the display 12. However, the designation image (212 and 214, in FIG. 9) that indicates the player name of the human player who played the random match from the start to the end is displayed in this evaluation screen 200.

In a next step S69, it is determined whether the counting of the down counter 854i is ended. That is, it is determined whether the first predetermined time period elapsed. If "NO" is determined in the step S69, that is, if the counting of the down counter 854i is not ended, the operation data is obtained from the controller in a step S71. Here, although the processor 81 obtains the operation data when the A button 53 is operated, the operation data may be obtained or may not be obtained from other buttons.

In a subsequent step S73, the operation data is transmitted to the main body apparatus 2 of the opponent player of the random match. However, the processor 81 skips processing of the step S73 if the operation data of the A button 53 is not obtained in the step S71. In a next step S75, the operation data from the main body apparatus 2 of the opponent player of the random match is received. However, if the opponent player of the random match does not operate the A button 53, the processor 81 does not receive the operation data in the step S75.

In a next step S77, the number of operation times of the A button 53 for each player is increased. That is, for each player, the number of applause is added and corresponding data of the number of applause (900m, etc.) is updated. Moreover, in a step S79, the total number is calculated. Here, the total number of applause of the number of applause is added for each player is calculated, thereby to update the total number data 854f.

Then, the evaluation screen 200 at the runtime is updated in a step S81, and the process returns to the step S69. In the step S81, the guide character 202 is displayed so as to applaud for each the third predetermined time period, and the both-hands image (216 and 218) corresponding to the player that operates the A button 53 is displayed so as to applaud. Moreover, the total number displayed inside the frame image of the image 220 is changed into the total number calculated in the step S79. Moreover, if a count value of the down counter 854i becomes remaining 3 (three) seconds, the image 222 is displayed above the image 220 as shown in FIG. 11. However, the image of the numeric character indicating the remaining number of seconds is displayed in the image 222.

Moreover, if "YES" is determined in the step S69, that is, if the counting of the down counter 854i is ended, the evaluation input is ended, and in a step S83, and the evaluation screen 200 displaying the accumulated value as shown in FIG. 11 is displayed. This evaluation screen 200 is displayed for few or several seconds (for example, three to five (3-5) seconds). The same applies when the evaluation screen 200 is displayed in a step S91 described later.

Subsequently, in the step S85, the total number is updated by adding the second predetermined number to the total number, and the updated total number is added to the accumulated value for each player. That is, the accumulated value is updated and the in-game currency is given to each player in a step S87 according to the total number.

In a next step S89, a title that can be selected according to the accumulated value is increased. However, the accumulated value needs to reach a value required to increase the selectable title. Then, the evaluation screen 200 that the accumulated value is updated is displayed on the display 12 in a step S91, and the evaluation processing is terminated, and the process returns to the overall processing.

Figure 28:
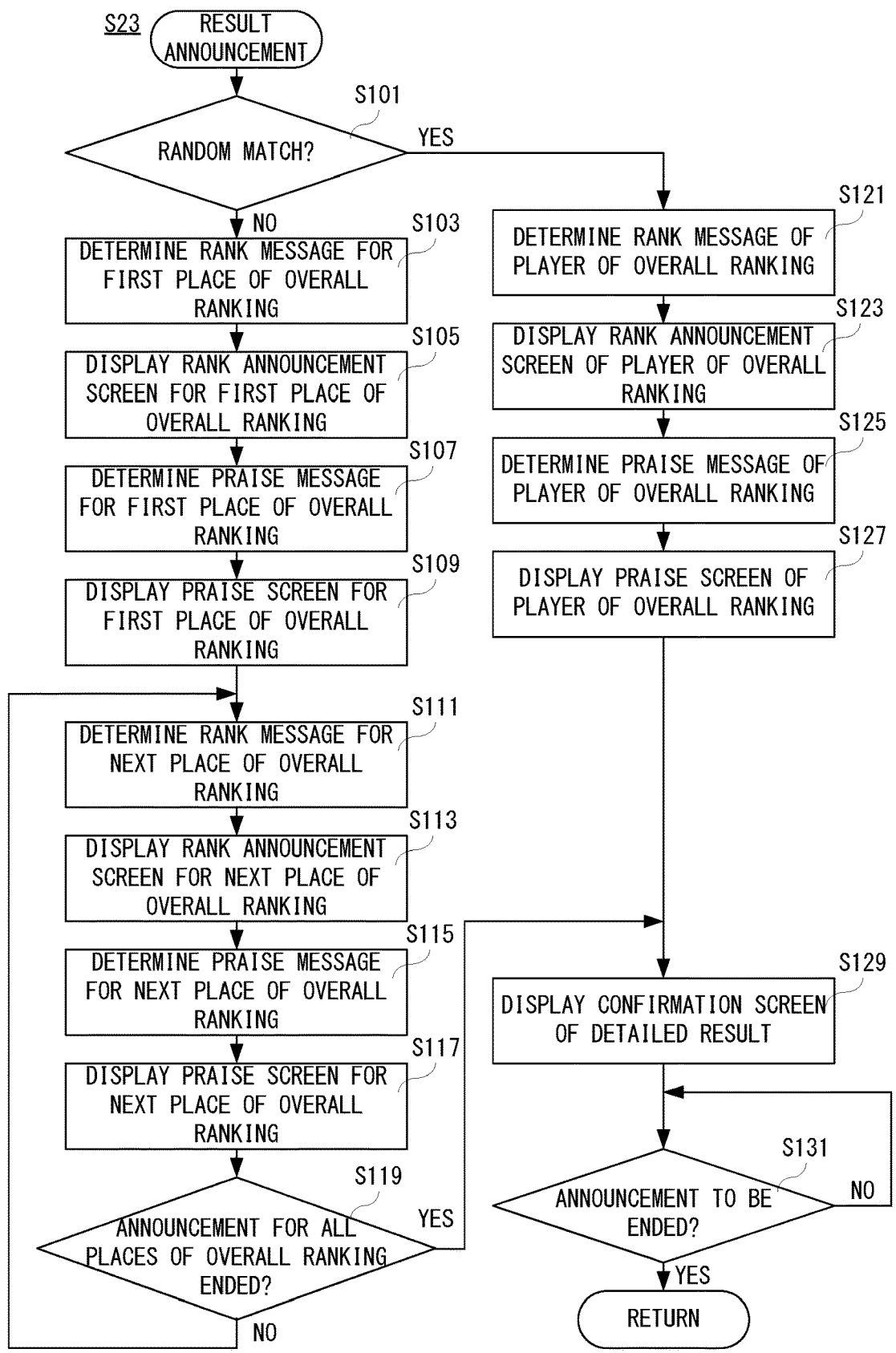
FIG. 28 is a flowchart showing non-limiting example result announcement processing of the processor of the main body apparatus shown in FIG. 6.

FIG. 28 is a flowchart showing non-limiting example result announcement processing in the step S19. As shown in FIG. 28, when starting the result announcement processing, the processor 81 determines, in a step S101, whether the virtual game having been played at this time is a virtual game of the random match. If "NO" is determined in the step S101, that is, if the virtual game played this time is a virtual game of the single-machine match, the local match or the friend match, in a step S103, a ranking message for the first place of the overall ranking is randomly determined from the ranking message table shown by the ranking message data 854g, and the ranking announcement screen 300 for the first place of the overall ranking as shown in FIG. 13 is displayed on the display 12 in a step S105. In the step S105, the ranking announcement screen 300 that the ranking message determined in the step S103 is used is displayed for few or several seconds (for example, three to five (3-5) seconds). The same applies when displaying the ranking announcement screen 300 is displayed in steps S113 and S123 described later.

In a next step S107, the praise message for the first place of the overall ranking is randomly determined, based on the priority, from the praise message table for the first place of the overall ranking shown by the praise message data 854h, and the praise screen 400 for the first place of the overall ranking as shown in FIG. 14 is displayed on the display 12 in a step S109. In the step S109, the praise screen 400 that the praise message for the first place of the overall ranking determined in the step S107 is used is displayed for few or several seconds (for example, three to five (3-5) seconds). The same applies when displaying the praise screen 400 is displayed in steps S117 and S127 described later.

Subsequently, the ranking message for a next place of the overall ranking is determined in a step S111. In the step S111 immediately after performing the processing of the step S109, a ranking message is randomly determined from the ranking message table for the second place of the overall ranking. In a step S113, the ranking announcement screen 300 for the next place is displayed on the display 12 using the ranking message determined in the step S111. After the praise screen 400 for the first place of the overall ranking is displayed, the ranking announcement screen 300 of the second place of the overall ranking as shown in FIG. 15 is displayed on the display 12.

Subsequently, in a next step S115, the praise message to the next place of the overall ranking is determined, based on the priority, from the praise message table except the first place of the overall ranking shown by the praise message data 854h, and the praise screen 400 for the next place of the overall ranking is displayed on the display 12 in a step S117 using the praise message determined in the step S115. After the ranking announcement screen 300 for the second place of the overall ranking is displayed, the praise screen 400 for the second place of the overall ranking as shown in FIG. 16 is displayed on the display 12.

Then in a step S119, it is determined whether all the places of the overall ranking are announced. If "NO" is determined in the step S119, that is, if there is a place of the overall ranking having not been announced, the process returns to the step S111. Therefore, the ranking announcement screen 300 and the praise screen 400 are displayed on the display 12 for the third place and lowers of the overall ranking similar to the second place of the overall ranking. On the other hand, if "YES" is determined in the step S119, that is, if all the places of the overall ranking is announced, the process proceeds to a step S129.

Moreover, if "YES" is determined in the step S101, that is, if the virtual game played this time is the virtual game of the random match, in a step S121, the ranking message for the player (i.e., the player using this main unit 2; and the same applies to steps S123, S125 and S127) is randomly determined the ranking message for the place of the overall ranking of the player from the ranking message table, and the ranking announcement screen 300 for the place of overall ranking of player is displayed in a step S123 using the ranking message determined in the step S121.

In a next step S125, the praise message for the place of the overall ranking of the player is determined, based on the priority, from the praise message table to the first place of the overall ranking corresponding to the place of the overall ranking of player or the praise message table except the first place of the overall ranking corresponding to the place of the overall ranking of player. Then, in a step S127, the praise screen 400 for the place of the overall ranking of the player is displayed using the praise message determined in the step S125, and then, the process proceeds to the step S129.

In the step S129, the detailed result confirmation screen 500 as shown in FIG. 20 is displayed on the display 12, and it is determined, in a step S131, whether the announcement is to be ended. In the step S131, it is determined whether an instruction for ending the announcement is given by operating a predetermined button. However, if the time period that the predetermined button is not operated elapsed for tens of seconds, it is determined to end the result announcement.

If "NO" is determined in the step S131, that is, if it is not the end of the announcement, the process returns to step S131. On the other hand, if "YES" is determined in the step S131, that is, if it is the end of the announcement, the result announcement processing is terminated, and the process returns to the overall processing.

In addition, in the result announcement processing shown in FIG. 28, prior to displaying the ranking announcement screen 300 and the praise screen 400 for each place of the overall ranking, the ranking message and the praise message for each place of the overall ranking are determined, but should not be limited. In another example, prior to displaying the ranking announcement screen 300 of the first place of the overall ranking and the praise screen 400 for the first place of the overall ranking, the ranking message and the praise message for all the places of the overall ranking may be determined.

According to this embodiment, since not only the ranking announce but also the praise screen containing the praise message for the praise content that is the index updated in the virtual game for each place is displayed, the display of the result announcement can be diversified.

Moreover, according to this embodiment, since the evaluation processing can be performed in a condition that a virtual game in the multiplayer game is played, and a reward such as an in-game currency can be obtained in the evaluation processing, it is possible to encourage praise or good evaluation for entire gameplay. Therefore, it is possible to raise the degree of satisfaction of the player participating in the game.

Furthermore, according to this embodiment, since the evaluation processing is performed when the virtual game is played in the random match, a feeling of satisfaction of the player participating in the game is increased by praising each other by the evaluation input even though a game participant is a strange player not registered in advance.

In addition, although a final ranking is announced in this embodiment, ranking on the way may be announced. When announcing the ranking on the way, a place of the ranking is also determined based on the number of possessed stars and the number of possessed coins. However, the number of times announcing the ranking on the way may be multiple times. In this case, praise message tables according to the rankings on the way may be prepared so that a praise message on the way can be displayed.

Moreover, although this embodiment shows the game system 1 as an example of a game system, structure thereof does not need to be limited, and further structure can be adopted. For example, in the above-described embodiment, the above-described "computer" is a single computer (specifically, the processor 81), but it may be a plurality of computers in another embodiment. The above-described "computer" may be a plurality of computers provided in a plurality of apparatuses, for example, and more specifically, the above-described "computer" may be constituted by the processor 81 of the main body apparatus 2 and the communication control sections (microprocessors) 101 and 111 provided on the controllers.

Moreover, although a case where the game image is displayed on the display 12 is described in the above-described embodiment, it does not need to be limited to this. The game image can be displayed also on a stationary monitor (for example, television monitor) by connecting the main body apparatus 2 to the stationary monitor via a cradle. In such a case, it is possible to constitute an information processing system including the game system 1 and the stationary monitor.

Furthermore, although this embodiment is described on a case where the game system 1 having structure that the left controller 3 and the right controller 4 are attachable to or detachable from the main body apparatus 2 is used, it does not need to be limited to this. For example, it is possible to use a game apparatus including the main body apparatus 2 integrally provided with an operation portion having operation buttons and analog sticks similar to those of the left controller 3 and the right controller 4, or a game apparatus such as further electronic equipment capable of executing a game program. The further electronic equipment corresponds to smartphones, tablet PCs or the like. In such a case, an operation portion may constitute with software keys.

Furthermore, specific numeral values and images shown in the above-described embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing system, comprising:
a plurality of game apparatuses each used by each of a plurality of players; and
one or more processors configured to:
  perform a competitive game in which the plurality of players compete against each other using the plurality of game apparatuses;
  determine a ranking of the players in the competitive game based on an evaluation value that is updated for each player in accordance with progress of the competitive game;
  update, for each player, an index associated with a game event, out of a plurality of indices that are related to the competitive game and different from the evaluation value, according to the game event occurring in the competitive game;
  determine, for each player, at least one notable index from the plurality of indices by comparing an index with those of other players;
  determine, for each player, an index message that is a message associated with the notable index; and
  output an image in which a plurality of index messages are arranged so that the index message determined for one's own player is displayed on one's own display, and the index message determined for another player is not displayed on the one's own display.

2. The information processing system according to the claim 1, wherein the one or more processors is/are further configured to execute further operations comprising classifying the plurality of players into two or more groups based on the ranking of the players,
wherein different indices messages are associated to the same notable index for each group.

3. The information processing system according to claim 2, wherein the plurality of players are classified into a first group including a player whose ranking is a first place and a second group including a player whose ranking is not the first place.

4. The information processing system according to claim 1, wherein an index that is of the first place out of the plurality of players is determined as the notable index.

5. The information processing system according to claim 1, wherein the one or more processors is/are further configured to execute further operations comprising determining, when the plurality of indices become candidates for notable indices, one notable index based on priorities associated with respective indices.

6. The information processing system according to claim 5, wherein the one or more processors is/are further configured to execute further operations comprising determining one notable index based on the priority that is set so as to make the index that is a first place alone easier to be determined as the notable index.

7. The information processing system according to claim 5, wherein the priority is changeable dependent on value of the index.

8. The information processing system according to claim 1, wherein the one or more processors is/are further configured to execute further operations comprising determining the notable index so that notable index does not duplicate between the players.

9. The information processing system according to claim 1, further comprising a plurality of game apparatuses each used by each of the plurality of players, wherein the one or more processors is/are further configured to execute further operations comprising:
  performing the competitive game by connecting the plurality of game apparatuses with each other directly or via a local area network, and
  outputting an image in which the index messages are arranged so that the index message determined for one's own player is displayed on one's own display and the index message determined for a further player is also displayed on the one's own display.

10. The information processing system according to claim 1, wherein
the competitive game is performed by connecting the plurality of game apparatuses with each other via a wide area network, and
when the competitive game is an online game that is randomly matched with a further player not pre-registered, the image, in which the index messages are arranged, is output so that the index message determined for one's own player is displayed on one's own display, and the index message determined for the further player is not displayed on the one's own display.

11. The information processing system according to claim 1, wherein one message is determined from a plurality of ranking messages associated with for the place of ranking, and an image in which the one ranking message is arranged is output so that the one ranking message is displayed on a display in addition to the index message.

12. The information processing system according to claim 1, wherein a general-purpose message is determined instead of the index message for the player for which no notable index exists, and an image in which the generic message is arranged is output so that the generic message is displayed instead of the index message.

13. The information processing system according to claim 1, wherein the ranking is a final ranking of the competitive game.

14. The information processing system according to claim 1, wherein the image in which the index message is arranged is output after outputting an image indicating the final ranking of the competitive game.

15. An information processing apparatus, comprising:
one or more processors; and
a memory configured to store computer readable instructions that, when executed by the one or more processors, cause the information processing apparatus to:
perform a competitive game in which a plurality of players compete against each other using a plurality of game apparatuses;
determine a ranking of the players in the competitive game based on an evaluation value that is updated for each player in accordance with progress of the competitive game;
update, for each player, an index associated with a game event, out of a plurality of indices that are related to the competitive game and different from the evaluation value, according to the game event occurring in the competitive game;
determine, for each player, at least one notable index from the plurality of indices by comparing an index with those of other players;
determine, for each player, an index message that is a message associated with the notable index; and
output an image in which a plurality of index messages are arranged so that the index message determined for one's own player is displayed on one's own display, and the index message determined for another player is not displayed on the one's own display.

16. A non-transitory computer-readable storage medium having stored therein an information processing program executable by one or more processors of an information processing apparatus, wherein the information processing program, when executed, is configured to cause the one or more processors to execute operations comprising:
performing a competitive game in which a plurality of players compete against each other using a plurality of game apparatuses;
determining a ranking of the players in the competitive game based on an evaluation value that is updated for each player in accordance with progress of the competitive game;
updating, for each player, an index associated with a game event, out of a plurality of indices that are related to the competitive game and different from the evaluation value, according to the game event occurring in the competitive game;
determining for each player, at least one notable index from the plurality of indices by comparing an index with those of other players;
determining, for each player, an index message that is a message associated with the notable index; and
outputting an image in which a plurality of index messages are arranged so that the index message determined for one's own player is displayed on one's own display, and the index message determined for another player is not displayed on the one's own display.

17. An information processing method executable by an information processing apparatus, the information processing method comprising:
performing a competitive game in which a plurality of players compete against each other using a plurality of game apparatuses;
determining a ranking of the players in the competitive game based on an evaluation value that is updated for each player in accordance with progress of the competitive game;
updating, for each player, an index associated with a game event, out of a plurality of indices that are related to the competitive game and different from the evaluation value, according to the game event occurring in the competitive game;
determining, for each player, at least one notable index from the plurality of indices by comparing an index with those of other players;
determining, for each player, an index message that is a message associated with the notable index; and
outputting an image in which a plurality of index messages are arranged so that the index message determined for one's own player is displayed on one's own display, and the index message determined for another player is not displayed on the one's own display.

18. The information processing apparatus of claim 15, wherein
the competitive game is performed by connecting the plurality of game apparatuses with each other via a wide area network, and
when the competitive game is an online game that is randomly matched with a further player not pre-registered, the image, in which the index messages are arranged, is output so that the index message determined for one's own player is displayed on one's own display, and the index message determined for the further player is not displayed on the one's own display.

19. The non-transitory computer readable storage medium of claim 16, wherein
the competitive game is performed by connecting the plurality of game apparatuses with each other via a wide area network, and
when the competitive game is an online game that is randomly matched with a further player not pre-registered, the image, in which the index messages are arranged, is output so that the index message determined for one's own player is displayed on one's own display, and the index message determined for the further player is not displayed on the one's own display.

20. The information processing method of claim 17, wherein
> the competitive game is performed by connecting the plurality of game apparatuses with each other via a wide area network, and
> in association with the competitive game being an online game that is randomly matched with a further player not pre-registered, the image, in which the index messages are arranged, is output so that the index message determined for one's own player is displayed on one's own display, and the index message determined for the further player is not displayed on the one's own display.

* * * * *